US012223189B2

(12) United States Patent
Xu et al.

(10) Patent No.: US 12,223,189 B2
(45) Date of Patent: Feb. 11, 2025

(54) DATA MANAGEMENT METHOD AND APPARATUS, COMPUTER DEVICE, AND STORAGE MEDIUM

(71) Applicant: TENCENT TECHNOLOGY (SHENZHEN) COMPANY LIMITED, Shenzhen (CN)

(72) Inventors: Yongxin Xu, Shenzhen (CN); Quanan Han, Shenzhen (CN); Furong Chen, Shenzhen (CN); Feilong Liang, Shenzhen (CN); Yuming Cui, Shenzhen (CN); Xiaojian Xia, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 116 days.

(21) Appl. No.: 18/296,987

(22) Filed: Apr. 6, 2023

(65) Prior Publication Data

US 2023/0305724 A1 Sep. 28, 2023

Related U.S. Application Data

(63) Continuation of application No. PCT/CN2022/098885, filed on Jun. 15, 2022.

(30) Foreign Application Priority Data

Jul. 14, 2021 (CN) .......................... 202110794085.5

(51) Int. Cl.
*G06F 3/06* (2006.01)
(52) U.S. Cl.
CPC .......... *G06F 3/0635* (2013.01); *G06F 3/0611* (2013.01); *G06F 3/067* (2013.01)
(58) Field of Classification Search
CPC ...... G06F 3/0635; G06F 3/0611; G06F 3/067; G06F 16/2471; G06F 9/5027; G06F 16/27; G06F 21/604
See application file for complete search history.

(56) References Cited

U.S. PATENT DOCUMENTS 11,954,002 B1 * 4/2024 Colgrove ............ G06F 12/1072
2015/0205646 A1 7/2015 Singh
(Continued)

FOREIGN PATENT DOCUMENTS

CN 101496005 A 7/2009
CN 103646051 A 3/2014
(Continued)

OTHER PUBLICATIONS

China National Intellectual Property Administration (CNIPA) Office Action 1 for 202110794085.5 Aug. 19, 2021 10 Pages (including translation).
The World Intellectual Property Organization (WIPO) International Search Report for PCT/CN2022/098885 Aug. 29, 2022 6 Pages (including translation).
Shalev, Ori, and Nir Shavit. "Split-ordered lists: Lock-free extensible hash tables." Journal of the ACM (JACM) 53.3 (2006): 379-405.
(Continued)

*Primary Examiner* — Tasnima Matin
(74) *Attorney, Agent, or Firm* — ANOVA LAW GROUP PLLC

(57) ABSTRACT

A data management method includes: receiving a node access request for a target storage node, and acquiring a target storage node primary key of the target storage node; traversing a connection mapping table based on the target storage node primary key; one connection stack including N pieces of network connection information in an idle connection state; N being a natural number; acquiring, in response to identifying a target connection stack corresponding to the target storage node primary key from the connection mapping table, target network connection information from N pieces of network connection information included in the target connection stack, establishing a target connection relationship with the target storage node based on the
(Continued)

target network connection information, and acquiring, from the target storage node based on the target connection relationship, service data requested by the node access request.

20 Claims, 9 Drawing Sheets

(56) References Cited

U.S. PATENT DOCUMENTS

| | | | |
|---|---|---|---|
| 2016/0328488 A1* | 11/2016 | Lytle | ............... G06F 16/252 |
| 2018/0159717 A1 | 6/2018 | Cormie et al. | |
| 2021/0117425 A1 | 4/2021 | Rao et al. | |

FOREIGN PATENT DOCUMENTS

| | | | | |
|---|---|---|---|---|
| CN | 106817402 A | | 6/2017 | |
| CN | 109543080 A | | 3/2019 | |
| CN | 109684414 A | | 4/2019 | |
| CN | 112187963 A | | 1/2021 | |
| CN | 112306991 A | | 2/2021 | |
| CN | 113014662 A | * | 6/2021 | |
| CN | 113239098 A | | 8/2021 | |

* cited by examiner

DATA MANAGEMENT METHOD AND APPARATUS, COMPUTER DEVICE, AND STORAGE MEDIUM

CROSS-REFERENCES TO RELATED APPLICATIONS

This application is a continuation application of PCT Patent Application No. PCT/CN2022/098885, entitled "DATA MANAGEMENT METHOD AND APPARATUS, COMPUTER DEVICE, AND STORAGE MEDIUM" and filed on Jun. 15, 2022, which claims priority to Chinese Patent Application No. 202110794085.5, entitled "DATA MANAGEMENT METHOD, COMPUTER, AND READABLE STORAGE MEDIUM" filed with the China National Intellectual Property Administration on Jul. 14, 2021, the entire contents of both of which are incorporated herein by reference.

FIELD OF THE TECHNOLOGY

The present disclosure relates to the field of computer technologies, and in particular, to a data management method and apparatus, a computer device, a computer readable storage medium, and a computer program product.

BACKGROUND OF THE DISCLOSURE

A distributed database system includes a computing node and a storage node. One computing node may manage multiple storage nodes associated with the computing node. The computing node does not store data itself. After receiving a service data request, the computing node acquires requested service data from the multiple associated storage nodes. For each service data request, the computing node needs to transmit the request to storage nodes by using a corresponding connection, and summarizes received replies of one or more storage nodes to obtain service data, and returns the service data to user equipment that initiates the service data request. The computing node may implement access to the storage node and data acquiring. When the computing node needs to communicate with the storage node, the computing node needs to temporarily establish a connection. After communication ends, the computing node releases the connection, or keeps the connection all the time, waits for next communication, and then uses the maintained connection. In this manner, a connection needs to be established each time, which causes a large amount of data acquiring overheads. If a large quantity of connections are established in a short time, an error of insufficient memory may also occur. If the connection is maintained all the time, the connection cannot be recycled in time when load is low. Thus, a large quantity of idle connections may exist in a system, thereby reducing performance.

SUMMARY

Various embodiments of the present disclosure provide a data management method and apparatus, a computer device, a computer readable storage medium, and a computer program product.

An aspect of the embodiments of the present disclosure provides a data management method, performed by a computer device. The method includes: receiving a node access request for a target storage node, and acquiring a target storage node primary key of the target storage node; traversing a connection mapping table based on the target storage node primary key; the connection mapping table including M storage node primary keys and connection stacks respectively corresponding to the M storage node primary keys, and M being a positive integer; one connection stack including N pieces of network connection information in an idle connection state; N being a natural number; and acquiring, in response to identifying a target connection stack corresponding to the target storage node primary key from the connection mapping table, target network connection information from N pieces of network connection information included in the target connection stack, establishing a target connection relationship with the target storage node based on the target network connection information, and acquiring, from the target storage node based on the target connection relationship, service data requested by the node access request.

An aspect of the embodiments of the present disclosure provides a data processing apparatus. The apparatus includes: a request receiving module, configured to receive a node access request for a target storage node; a primary key acquiring module, configured to acquire a target storage node primary key of the target storage node; a mapping traversal module, configured to traverse a connection mapping table based on the target storage node primary key; the connection mapping table including M storage node primary keys and connection stacks respectively corresponding to the M storage node primary keys, and M being a positive integer; one connection stack including N pieces of network connection information in an idle connection state; N being a natural number; a connection acquiring module, configured to: acquire, in response to identifying a target connection stack corresponding to the target storage node primary key is traversed from the connection mapping table, target network connection information from N pieces of network connection information included in the target connection stack; and a data acquiring module, configured to: establish a target connection relationship with the target storage node based on the target network connection information, and acquire, from the target storage node based on the target connection relationship, service data requested by the node access request.

An aspect of the embodiments of the present disclosure provides a computer device, including a memory and one or more processors. The memory stores computer readable instructions. When the one or more processors execute the computer readable instructions, the data management method in the embodiments of the present disclosure is implemented.

An aspect of the embodiments of the present disclosure provides one or more non-transitory computer readable storage media. The non-volatile computer readable storage medium stores computer readable instructions. When one or more processors execute the computer readable instructions, the data management method in the embodiments of the present disclosure is implemented.

An aspect of the embodiments of the present disclosure provides a computer program product or a computer program. The computer program product or the computer program includes computer readable instructions. When one or more processors execute the computer readable instructions, the method provided in optional manners in the embodiments of the present disclosure is implemented. Details of one or more embodiments of the present disclosure are provided in the accompanying drawings and descriptions below. Other features, objectives, and advantages of the present disclosure become apparent from the specification, the accompanying drawings, and the claims.

BRIEF DESCRIPTION OF THE DRAWINGS

To describe technical solutions in embodiments of the present disclosure or the related art more clearly, the following briefly introduces the accompanying drawings required for describing the embodiments or the related art. Apparently, the accompanying drawings in the following description show only some embodiments of the present disclosure, and a person of ordinary skill in the art may still derive other drawings from these accompanying drawings without creative efforts.

DESCRIPTION OF EMBODIMENTS

Figure 1:
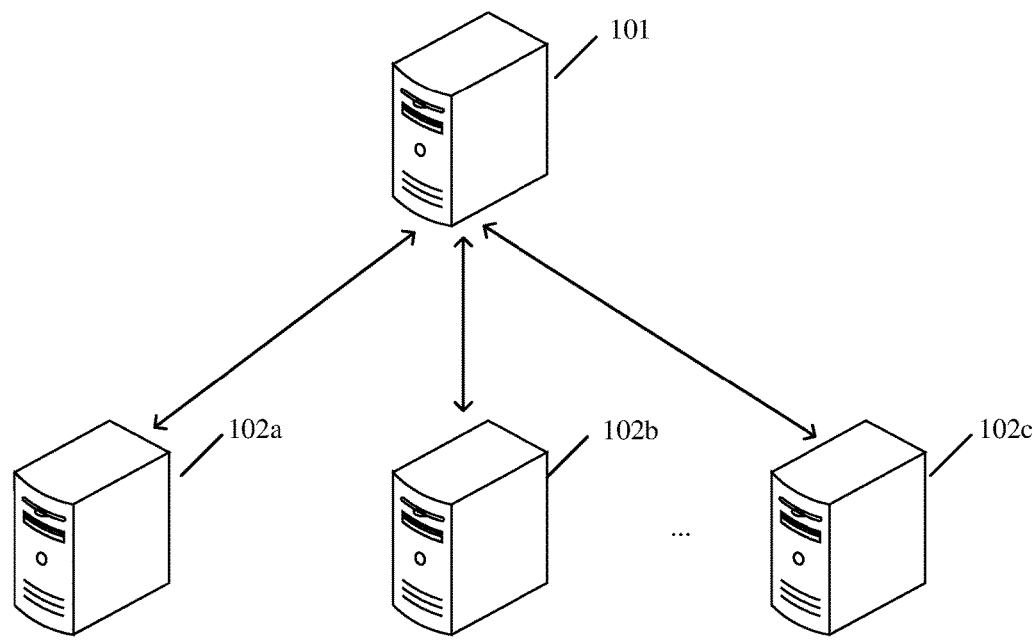
FIG. 1 is a diagram of a network interaction architecture of data management according to an embodiment of the present disclosure.

The technical solutions in embodiments of the present disclosure are clearly and completely described in the following with reference to the accompanying drawings in the embodiments of the present disclosure. Apparently, the described embodiments are merely some rather than all of the embodiments of the present disclosure. All other embodiments obtained by a person of ordinary skill in the art based on the embodiments of the present disclosure without making creative efforts shall fall within the protection scope of the present disclosure.

In the embodiments of the present disclosure, data management may be implemented by using a cloud technology and a blockchain technology. Specifically, a computing node in the present disclosure may manage multiple storage nodes. The computing node may establish multiple connections to each storage node. In this process, a large quantity of data may be generated, and management of a connection, service data, and the like in the present disclosure may be implemented by using a big data technology, for example, data transmission between the computing node and the storage node is implemented based on a data transmission technology.

Cloud storage is a new concept extended and developed on a concept of cloud computing. A distributed cloud storage system (hereinafter referred to as a storage system) refers to a storage system that combines various storage devices (also referred to as storage nodes) in a network by using functions such as a cluster application, a grid technology, and a distributed storage file system, to work together by using application software or application interfaces to provide data storage and service access functions to the outside. In the present disclosure, data storage may be implemented based on the cloud storage technology, for example, a connection mapping table and a connection stack are stored based on the cloud storage technology.

In some embodiments, in the present disclosure, data involved in the present disclosure may be stored and managed based on a blockchain technology, so as to improve data management security.

Some terms involved in the present disclosure are explained as follows:

A distributed database system generally uses a relatively small computer system, and each computer may be separately located in one place. Each computer may have a complete copy or partial copy of a database management system (DBMS), and has a local database. Multiple computers located in different locations can be connected to each other through a network to form a complete, global, logically centralized, and physically distributed large database.

A computing node is a node that is in a distributed database system with computing separated from storage and that is used for parsing a structured query language, performing logical optimization, or generating an execution plan. A storage node is a node that is in a distributed database system with computing separated from storage and that is used for performing an input/output operation and storing/reading data.

A connection pool is used for maintaining a cache of a database connection, that is, the connection pool is used for maintaining a connection between a computing node and a storage node.

In this embodiment of the present disclosure, referring to FIG. 1, FIG. 1 is a diagram of a network interaction architecture of data management according to an embodiment of the present disclosure. This embodiment of the present disclosure may be implemented by a computing node. A computing node 101 may manage one or at least two storage nodes, that is, may be connected to one or at least two storage nodes, such as a storage node 102a, a storage node 102b, and a storage node 102c. Multiple connections may be established between the computing node 101 and each storage node. After receiving a service data request, the computing node 101 parses the service data request to obtain f node access requests, where f is a positive integer, and each node access request is used for accessing one storage node. The service data in the present disclosure is stored in different storage nodes. When the computing node 101 receives the service data request, service data requested by the service data request may be data stored on different storage nodes. The computing node 101 may parse the service data request to obtain f node access requests. The computing node 101 may access corresponding storage nodes based on the f node access requests, acquire service data from storage nodes respectively corresponding to the f node access requests, combine the service data transmitted by the f storage nodes to obtain a data acquiring result, and transmit the data acquiring result to user equipment that initiates the service data request.

Figure 2:
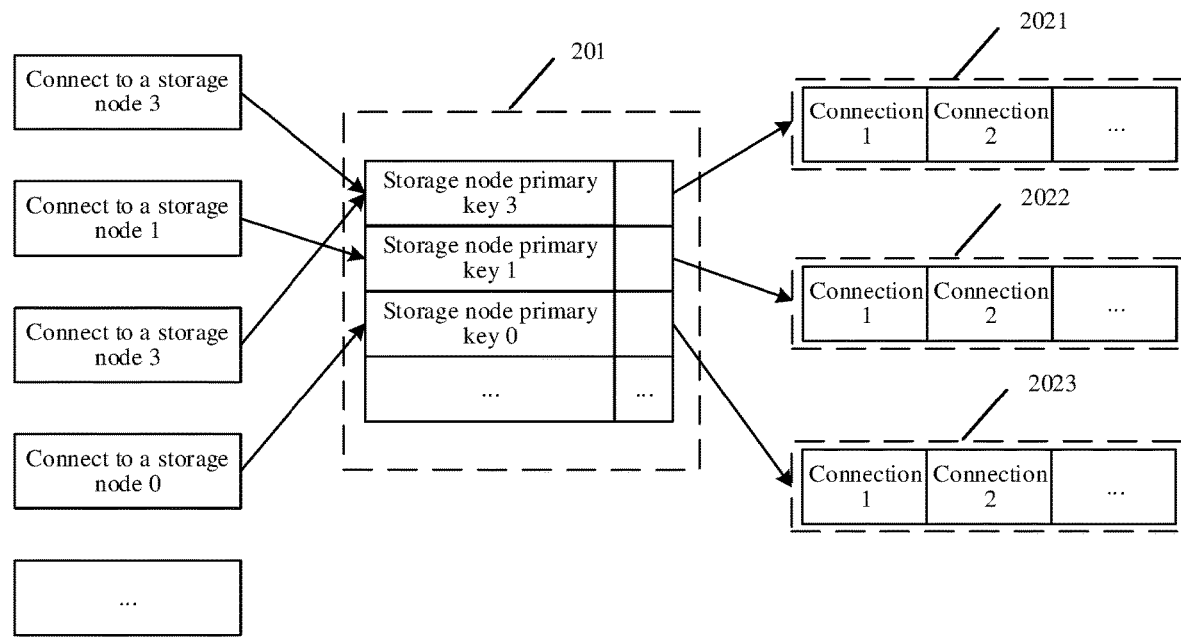
FIG. 2 is a schematic diagram of a data architecture according to an embodiment of the present disclosure.

Further, referring to FIG. 2, FIG. 2 is a schematic diagram of a data architecture according to an embodiment of the present disclosure. As shown in FIG. 2, a connection mapping table 201 is maintained in the present disclosure. The connection mapping table 201 includes M storage node primary keys and connection stacks respectively corresponding to the M storage node primary keys, and M is a positive integer. For example, the connection mapping table 201 includes a storage node primary key 3 and a connection stack 2021 corresponding to the storage node primary key 3, a storage node primary key 1 and a connection stack 2022 corresponding to the storage node primary key 1, and a storage node primary key 0 and a connection stack 2023 corresponding to the storage node primary key 0. For example, the computing node receives a node access request for the storage node 3, traverses the connection mapping table 201 based on the storage node primary key 3 corresponding to the storage node 3, and if the connection stack 2021 corresponding to the storage node primary key 3 is found, performs out-of-stack processing on network connection information at the top of the connection stack 2021 to acquire target network connection information, and acquires, based on the target network connection information, service data requested by the node access request from the storage node 3.

Figure 3:
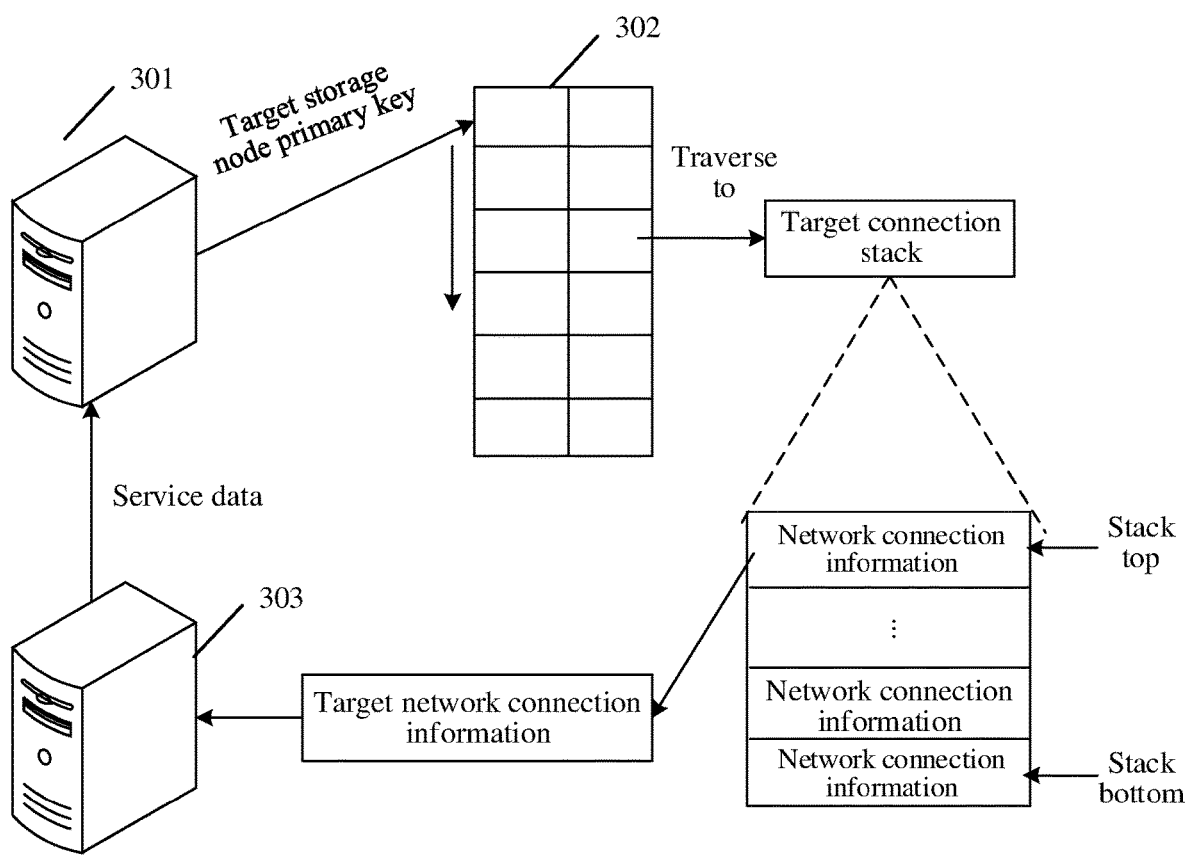
FIG. 3 is a schematic diagram of a data management scenario according to an embodiment of the present disclosure.

Specifically, as shown in FIG. 3, FIG. 3 is a schematic diagram of a data management scenario according to an embodiment of the present disclosure. As shown in FIG. 3, a computing node 301 receives a node access request for a target storage node, acquires a target storage node primary key of the target storage node, traverses a connection mapping table 302 based on the target storage node primary key, that is, searches the connection mapping table 302 for the target storage node primary key, so as to detect whether the target storage node primary key exists in the connection mapping table. When traversing a target connection stack corresponding to the target storage node primary key in the connection mapping table 302, the computing node acquires target network connection information from N pieces of network connection information included in the target connection stack, where N is a positive integer, the target connection stack includes N pieces of network connection information in an idle connection state, and the idle connection state indicates network connection information that is not running, and the network connection information is used for indicating a connection between the computing node and a storage node corresponding to a connection stack on which the network connection information is located. The computing node 301 acquires, from a target storage node 303 based on the target network connection information, service data requested by the node access request. A connection mapping table and a stack are introduced, so that a computing node can manage multiple storage nodes by using the connection mapping table, and can manage multiple connections to one storage node by using the stack, so that when the computing node needs to access a storage node, a connection between the storage node that needs to be accessed and the computing node (specifically, network connection information is obtained) can be conveniently found. The computing node can acquire, based on the found connection, service data from the storage node that needs to be accessed, thereby improving data management validity and efficiency.

It may be understood that both the computing node and the storage node mentioned in this embodiment of the present disclosure each may be a computer device. The computer device in this embodiment of the present disclosure includes but is not limited to a terminal device or a server. In other words, the computer device may be a server or a terminal device, or may be a system including a server and a terminal device. The foregoing mentioned terminal device may be an electronic device, including but not limited to a mobile phone, a tablet computer, a desktop computer, a laptop computer, a palmtop computer, an in-vehicle device, an augmented reality/virtual reality (AR/VR) device, a helmet display, an intelligent television, a wearable device, an intelligent sound box, a digital camera, a camera, another mobile Internet device (MID) that has a network access capability, or a terminal device in a scenario such as a train, a ship, or a flight. The foregoing mentioned server may be an independent physical server, or may be a server cluster or a distributed system formed by multiple physical servers, or may be a cloud server that provides basic cloud computing service such as a cloud service, a cloud database, cloud computing, a cloud function, cloud storage, a network service, cloud communication, a middleware service, a domain name service, a security service, a vehicle infrastructure cooperative system, a content distribution network (CDN), big data, and an artificial intelligence platform.

In some embodiments, data involved in this embodiment of the present disclosure may be stored in a computer device, or may be stored based on a cloud storage technology or a blockchain technology, which is not limited herein.

Figure 4:
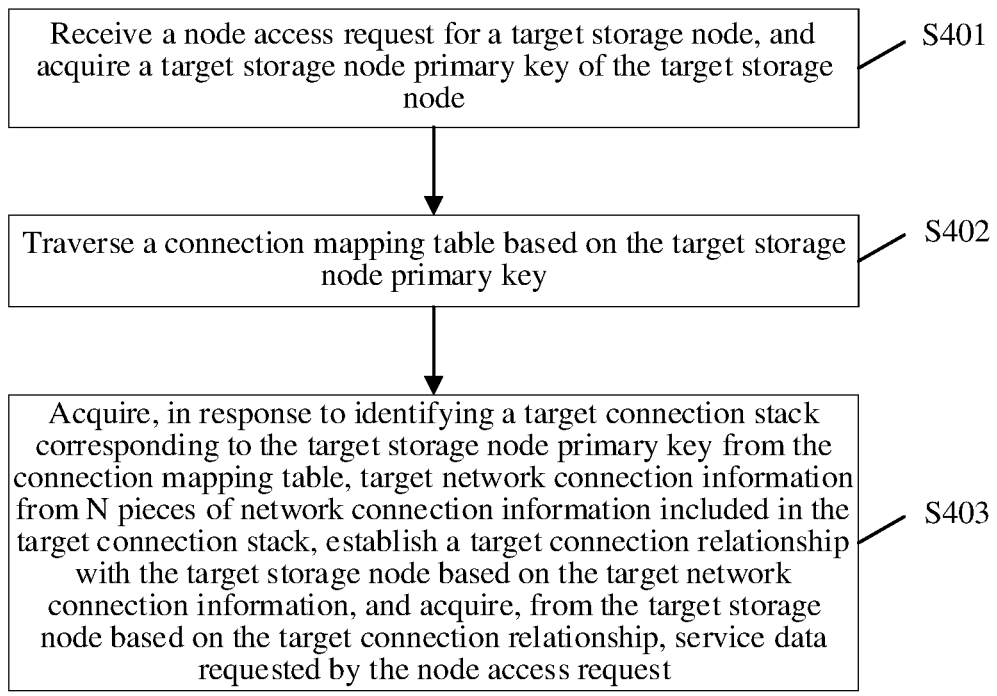
FIG. 4 is a flowchart of a data management method according to an embodiment of the present disclosure.

Further, referring to FIG. 4, FIG. 4 is a flowchart of a data management method according to an embodiment of the present disclosure. As shown in the FIG. 4, the data management process includes the following steps:

Step S401: Receive a node access request for a target storage node, and acquire a target storage node primary key of the target storage node.

In this embodiment of the present disclosure, the computing node receives the node access request for the target storage node, and acquires the target storage node primary key of the target storage node. Specifically, the computing node may acquire a target node name and a target node version number of the target storage node, and combine the target node name and the target node version number to generate the target storage node primary key of the target storage node. Specifically, the computing node may generate a node hash value of the target node name and the target node version number, and determine the node hash value as the target storage node primary key of the target storage node. Alternatively, the computing node may directly concatenate the target node name and the target node version number to obtain the target storage node primary key of the target storage node. For example, if the target node name of the target storage node is pt1 and the target node version number is 0, the computing node may concatenate the target node name and the target node version number of the target storage node to obtain the target storage node primary key "pt10" of the target storage node, or may separate and concatenate the target node name and the target node version number, for example, add a separator (such as #) between the target node name and the target node version number to obtain the target storage node primary key of the target storage node, for example, "pt1 #0", which is not limited herein. The target node name refers to a name of the target storage node, and is used for indicating node address information of the target storage node, such as an Internet Protocol address (IP address) and a node port number of the target storage node. The computing node may access the target storage node based on the node address information. The target node version number is used for indicating a changed version of the node address information to which the target node name points. In other words, when the node address information to which the target node name points is updated, the computing node updates the target node version number, and the target node name is associated with the target node name. For example, it is assumed that pt1 points to a storage node whose IP address is 172.114.8.9 and node port number is 3306. In this case, it is assumed that the target storage node primary key is "pt1 #0". When the storage node that pt1 points to is updated to a storage node whose IP address is 172.114.10.10 and node port number is 3306 (that is, the storage node that the target storage node primary key points to is updated), the target node version number is updated to obtain a new target storage node primary key "pt1 #1". The target name may be considered as a code number or a name of a node, and does not include an actual physical meaning. Similarly, a storage node primary key of each storage node may be obtained.

Specifically, when receiving an update request for first node address information, the computing node determines a first storage node primary key corresponding to the first node address information. The computing node may acquire a first connection stack corresponding to the first storage node primary key, delete the first connection stack, release a memory of the first connection stack, and update a first node version number in the first storage node primary key to a second node version number, where the second node version number is used for indicating an updated version of a storage node corresponding to a first node name in the first storage node primary key. The computing node generates a second storage node primary key based on a second node version number and the first node name in the first storage node primary key, creates a second connection stack for the second storage node primary key, associates the second storage node primary key and the second connection stack, stores the second storage node primary key into a connection mapping table, and points the second storage node primary key to second node address information. The second node address information refers to address information of a storage node requested by the update request for the first node address information.

Step S402: Traverse a connection mapping table based on the target storage node primary key.

In this embodiment of the present disclosure, the connection mapping table includes M storage node primary keys and connection stacks respectively corresponding to the M storage node primary keys, M is a positive integer, one connection stack includes N pieces of network connection information in an idle state, and N is a natural number (that is, 0 or a positive integer). Values of N corresponding to different connection stacks may be different. For example, a connection stack 1 includes five pieces of network connection information, a connection stack 2 includes eight pieces of network connection information, and N corresponding to the connection stack 1 is 5, and N corresponding to the connection stack 2 is 8. The computing node may add a first read lock in a first read/write lock to a connection acquiring thread, and search the connection mapping table for the target storage node primary key based on the first read lock, so as to perform a read operation on the connection mapping table based on the target storage node primary key. The read/write lock is a special spin lock, and visitors to a shared resource are divided into a reader and a writer. One read/write lock can have only one writer or more readers at the same time. That is, only one write thread can be used at a time, but multiple threads can simultaneously read data, and the read/write lock maintains a pair of locks (a read lock and a write lock). Specifically, the computing node may create a table traversal pointer based on a connection stack instance. Based on the table traversal pointer, the M storage node primary keys in the connection mapping table are sequentially pointed to, when the table traversal pointer points to the last storage node primary key in the M storage node primary keys and the target storage node primary key is not found in the connection mapping table, it is determined that the target connection stack corresponding to the target storage node primary key is not traversed/found in the connection mapping table. When the table traversal pointer does not point to the last storage node primary key of the M storage node primary keys, and the target storage node primary key is found, it is determined that the target connection stack corresponding to the target storage node primary key is traversed/identified in the connection mapping table, that is, a connection stack associated with the target storage node primary key to which the table traversal pointer points is determined as the target connection stack.

Step S403: Acquire, in response to identifying a target connection stack corresponding to the target storage node primary key from the connection mapping table, target network connection information from N pieces of network connection information included in the target connection stack, establish a target connection relationship with the target storage node based on the target network connection information, and acquire, from the target storage node based on the target connection relationship, service data requested by the node access request.

In this embodiment of the present disclosure, when the target connection stack corresponding to the target storage node primary key is identified from the connection mapping table, out-of-stack processing is performed on network connection information located at a top of the stack from the N pieces of network connection information included in the target connection stack, and the out-of-stack network connection information is determined as the target network connection information. For example, when the computing node adds the first read lock in the first read/write lock to the connection acquiring thread, when traversing the target connection stack corresponding to the target storage node primary key in the connection mapping table, the computing node unlocks the first read lock, and performs out-of-stack processing on the network connection information located at the top of the stack from the N pieces of network connection information included in the target connection stack, so as to determine the out-of-stack network connection information as the target network connection information. For another example, when traversing the target connection stack, the computing node may add a mutex lock to the connection acquiring thread, detect whether the target connection stack is empty, unlock the mutex lock when the target connection stack is empty, and execute a process of unlocking the first read lock when the target connection stack corresponding to the target storage node primary key is not traversed/found in the connection mapping table; and when the target connection stack is not empty, perform out-of-stack processing on the network connection information at the top of the stack from the N pieces of network connection information included in the target connection stack, determine the out-of-stack network connection information as the target network connection information, and unlock the mutex lock.

Further, when the computing node does not traverse the target connection stack corresponding to the target storage node primary key in the connection mapping table, the computing node may perform an unlock operation on the first read lock, and add a blocking waiting thread to the connection acquiring thread; the blocking waiting thread being in a blocking running state. Specifically, the computing node may create a waiting processing component and a blocking condition structure, where the waiting processing component includes storage node information and a second read/write lock, the storage node information includes node information and the like respectively corresponding to h storage nodes, and h is a positive integer. The second read/write lock is used for protecting the waiting processing component, maintaining security of the blocking waiting thread generated by the waiting processing component and the blocking condition structure, and improving thread running security. It is assumed that the computing node is associated with p storage nodes. Because node information of the p storage nodes is not necessarily all added to the waiting processing component, h is less than or equal to p, where p is a positive integer. The blocking condition structure may include a blocking condition object used for representing a blocking status and a first mutex lock, where the blocking status includes a blocking running state and a blocking release state, the first mutex lock is used for protecting security of the blocking condition object, and the blocking condition object may be an object of a blocking mechanism type in a standard thread library. Specifically, the computing node may maintain one blocking condition structure for each storage node. For example, if h storage nodes exist, there are h blocking condition structures. The computing node may generate storage node information in the waiting processing component according to the node information respectively corresponding to the h storage nodes and the blocking condition structure. The storage node information may be a hash map structure.

Further, the computing node may invoke the connection acquiring thread to traverse the connection mapping table again based on the target storage node primary key when the blocking waiting thread recovers from the blocking running state to the blocking release state.

Specifically, the computing node may acquire a waiting processing component, and add a second read lock in a second read/write lock associated with the waiting processing component to the blocking waiting thread; the waiting processing component including storage node information and the second read/write lock. The searching the target storage node information corresponding to the target storage node primary key based on the waiting processing component is specifically as follows: The computing node searches the storage node information included in the waiting processing component for the target storage node information. When the computing node does not find the target storage node information in the storage node information, the computing node unlocks the second read lock in the second read/write lock, to determine that the target connection stack corresponding to the target storage node is not traversed/found in the connection mapping table, to end the connection acquiring thread and the blocking waiting thread. When the computing node finds the target storage node information, it indicates that the target storage node exists in the waiting processing component. The computing node may monitor a blocking status corresponding to the blocking waiting thread; the blocking status including the blocking running state or the blocking release state.

Specifically, when finding the target storage node information to monitor the blocking status of the blocking waiting thread, the computing node may acquire the blocking condition structure; the blocking condition structure including a blocking condition object used for representing the blocking status and a first mutex lock. The mutex lock is used for protecting data, so that only one thread can perform a write operation each time, so as to ensure data accuracy in a multi-thread case. The computing node adds the first mutex lock in the blocking condition structure to the blocking waiting thread, and acquires the object status of the blocking condition object from the blocking waiting thread that carries the first mutex lock. Specifically, the computing node may acquire the blocking condition object, the first mutex lock, a blocking waiting time, and the like, perform a thread waiting operation according to the blocking condition object, the first mutex lock, the blocking waiting time, and the like, and determine the object status of the blocking condition object based on a result of the thread waiting operation. When the object status is obtained, the computing node unlocks the first mutex lock in the blocking waiting thread. When the object status of the blocking condition object is an object abnormal state, it is determined that the target storage node is not found, and the connection acquiring thread and the blocking waiting thread are ended; and the connection acquiring thread is invoked when the object status of the blocking condition object is an object waking state, and in the connection acquiring thread, the connection mapping table is traversed again based on the target storage node primary key.

When the object status of the blocking condition object is acquired from the blocking waiting thread that carries the first mutex lock, the computing node may determine, in the blocking waiting thread that carries the first mutex lock, that the object status of the blocking condition object is an object abnormal state when a thread exception occurs in the blocking waiting thread. Specifically, the computing node may monitor the thread waiting operation. When no wake-up signal is received for the blocking condition object within the blocking waiting time, or an abnormal interrupt, such as a system error or an abnormal hardware interrupt, occurs during the thread waiting operation, it indicates that the blocking waiting thread has a thread exception, and it is determined that the object status of the blocking condition object is an object abnormal state. It is determined that the object status of the blocking condition object is an object wake-up state when the blocking waiting thread acquires, within a blocking waiting time, a wake-up signal of a connection push-to-stack thread for the blocking condition object. The wake-up signal is initiated after the computing node successfully adds to-be-stacked network connection information to the target connection stack based on the connection push-to-stack thread. The to-be-stacked network connection information refers to a process of adding the target network connection information to the target connection stack by using completed network connection information. For details, refer to FIG. 6.

Specifically, when obtaining the target network connection information, the computing node may establish a target connection relationship with the target storage node based on the target network connection information, and acquire, from the target storage node based on the target connection relationship, service data requested by the node access request. Further, after successfully obtaining the service data, the computing node may perform push-to-stack processing on the target network connection information, so that the network connection information in the target connection stack can be reused. In other words, by performing out-of-stack and push-to-stack processing on the target network connection information, when the node access request for the target storage node is not completed, the target connection stack does not include the target network connection information, and another request cannot obtain the target network connection information. Therefore, in the present disclosure, connections to multiple storage nodes as pointed to by a single computing node can be cached, including multiple connections to each storage node (that is, network connection information) as pointed to by the computing node, and each piece of network connection information is one thread service, ensuring thread security of a system during concurrent running.

In the foregoing embodiment, the computing node receives the node access request for the target storage node, and acquires the target storage node primary key of the target storage node; traverses the connection mapping table based on the target storage node primary key; the connection mapping table including M storage node primary keys and connection stacks respectively corresponding to the M storage node primary keys, and M being a positive integer; one connection stack including N pieces of network connection information in an idle connection state; N being a natural number; acquires, in response to identifying a target connection stack corresponding to the target storage node primary key from the connection mapping table (i.e., from the previous traversing), target network connection information from N pieces of network connection information included in the target connection stack, establishes a target connection relationship with the target storage node based on the target network connection information, and acquires, from the target storage node based on the target connection relationship, service data requested by the node access request. In the foregoing process, a mapping table and a stack are introduced, and the computing node is associated with the storage node by using the mapping table, so that a connection between the computing node and each storage node can be managed, that is, multiple connection pools are managed, connections inside each connection pool point to the same storage node, and the connection pool is managed by using the stack. Each stack may manage multiple connections between the computing node and the storage node, so that the computing node can conveniently find a storage node that needs to be accessed, and acquire, from the stack, a connection used for accessing the storage node, thereby improving convenience and efficiency of data management.

Figure 5:
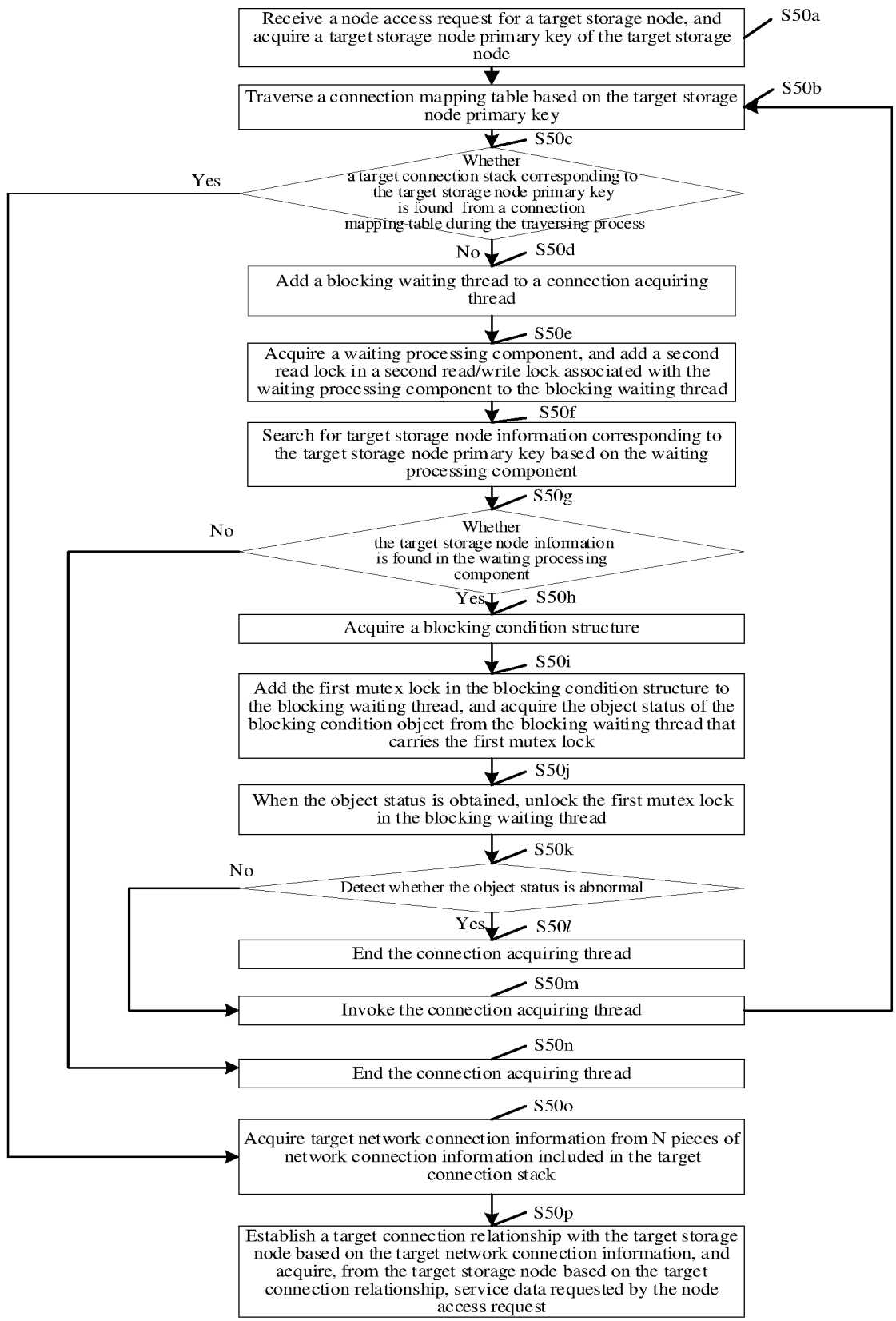
FIG. 5 is a specific flowchart of a data management method according to an embodiment of the present disclosure.

Specifically, referring to FIG. 5, FIG. 5 is a specific flowchart of a data management method according to an embodiment of the present disclosure, applied to a computing node. As shown in FIG. 5, the method includes the following steps:

Step S50a: Receive a node access request for a target storage node, and acquire a target storage node primary key of the target storage node.

Step S50b: Traverse a connection mapping table based on the target storage node primary key.

Step S50c: Detect whether a target connection stack corresponding to the target storage node primary key is found during the traversing process.

In this embodiment of the present disclosure, the computing node detects whether the target connection stack corresponding to the target storage node primary key is found in the connection mapping table during the traversing process, and if the target connection stack corresponding to the target storage node primary key is not found during the traversing process, step S50d is performed. If the target connection stack corresponding to the target storage node primary key is found during the traversing process, step S50o is performed.

Step S50d: Add a blocking waiting thread to a connection acquiring thread.

Step S50e: Acquire a waiting processing component, and add a second read lock in a second read/write lock associated with the waiting processing component to the blocking waiting thread.

Step S50f: Search for target storage node information corresponding to the target storage node primary key based on the waiting processing component.

Step S50g: Detect whether the target storage node information is found in the waiting processing component.

In this embodiment of the present disclosure, the computing node detects whether the target storage node information is found in the waiting processing component, and if the target storage node information is found in the waiting processing component, step S50h is performed. If the target storage node information is not found in the waiting processing component, step S50n is performed.

Step S50h: Acquire a blocking condition structure.

Step S50i: Add a first mutex lock in the blocking condition structure to a blocking waiting thread, determine a blocking waiting thread that carries a first mutex lock, and acquire an object status of a blocking condition object from the blocking waiting thread.

Step S50j: When the object status is obtained, unlock the first mutex lock in the blocking waiting thread.

Step S50k: Detect whether the object status is abnormal.

In this embodiment of the present disclosure, the computing node may detect whether the object status is abnormal. If the object status is an object abnormal state, step S50l is performed. If the object status is an object wake-up state, step S50m is performed.

Step S50l: When the object status of the blocking condition object is an object abnormal state, end the connection acquiring thread.

Step S50m: Invoke the connection acquiring thread when the object status of the blocking condition object is an object wake-up state.

In this embodiment of the present disclosure, when the object status of the blocking condition object is an object waking state, the connection acquiring thread is invoked, and step S50b is performed to traverse the connection mapping table again.

Step S50n: End the connection acquiring thread.

In this embodiment of the present disclosure, when the target storage node information is not found from the waiting processing component, a second read lock carried in the blocking waiting thread is unlocked to end the connection acquiring thread. Alternatively, the connection acquiring thread is ended, and then the second read lock carried in the blocking waiting thread is unlocked. Because the connection acquiring thread ends, the read lock does not need to be protected. Therefore, before or after the connection acquiring thread ends, the second read lock carried in the blocking waiting thread may be unlocked, which does not affect normal running of the thread.

Step S50o: Acquire target network connection information from N pieces of network connection information included in the target connection stack.

In this embodiment of the present disclosure, when the target connection stack corresponding to the target storage node primary key is found from the connection mapping table during a traversing process, the computing node may acquire the target network connection information from the N pieces of network connection information included in the target connection stack. In some embodiments, the computing node may detect whether the target connection stack is empty. When the target connection stack is empty, the computing node performs step S50d; and when the target connection stack is not empty, performs out-of-stack processing on the target connection stack, determines the out-of-stack network connection information as the target network connection information, and performs step S50p.

Step S50p: Establish a target connection relationship with the target storage node based on the target network connection information, and acquire, from the target storage node based on the target connection relationship, service data requested by the node access request.

Figure 6:
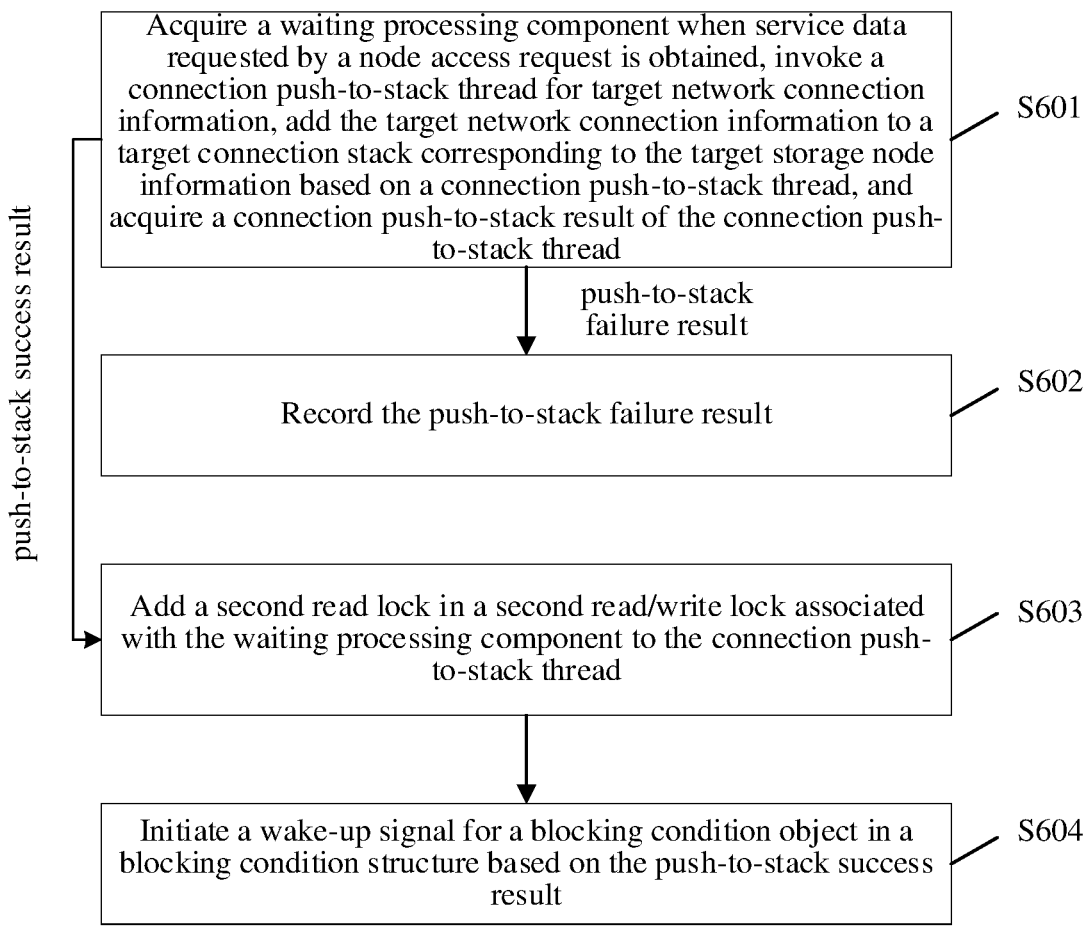
FIG. 6 is a flowchart of a connection push-to-stack method according to an embodiment of the present disclosure.

Further, referring to FIG. 6, FIG. 6 is a flowchart of a connection push-to-stack method according to an embodiment of the present disclosure. As shown in FIG. 6, the connection push-to-stack method includes the following steps:

Step S601: Acquire a waiting processing component when service data requested by a node access request is obtained, invoke a connection push-to-stack thread for target network connection information, add the target network connection information to a target connection stack corresponding to the target storage node information based on a connection push-to-stack thread, and acquire a connection push-to-stack result of the connection push-to-stack thread.

In this embodiment of the present disclosure, when the service data requested by the node access request is obtained, it may be considered that running of the target network connection information ends, that is, the target network connection information is already in an idle connection state and may be invoked by another thread. Therefore, push-to-stack processing may be performed on the target network connection information. When the connection push-to-stack result is an push-to-stack failure result, step S602 is performed; and when the connection push-to-stack result is an push-to-stack success result, step S603 is performed.

Step S602: When the connection push-to-stack result of the connection push-to-stack thread is an push-to-stack failure result, record the push-to-stack failure result.

Step S603: Add a second read lock in a second read/write lock associated with a waiting processing component to the connection push-to-stack thread when the connection push-to-stack result of the connection push-to-stack thread is an push-to-stack success result.

Step S604: Initiate a wake-up signal for a blocking condition object in a blocking condition structure based on the push-to-stack success result.

In this embodiment of the present disclosure, target storage node information is searched for based on the waiting processing component, when the target storage node information is not found from the waiting processing component, the connection push-to-stack thread ends, and the second read lock is unlocked, where the target storage node information refers to node information of the target storage node. When the target storage node information is found, the first mutex lock in the blocking condition structure is added to the connection push-to-stack thread, a wake-up signal for the blocking condition object in the blocking condition structure is initiated, and the first mutex lock associated with the connection push-to-stack thread is unlocked. Further, the second read lock is unlocked.

Specifically, the computing node may invoke a connection push-to-stack thread for the target network connection information when the service data requested by the node access request is obtained, create a target stack pointer based on the connection push-to-stack thread, and acquire the target storage node primary key corresponding to the target network connection information; search the connection mapping table for the target storage node primary key based on the target stack pointer; and acquire a primary key search result of the target storage node primary key, and acquire the target connection stack corresponding to the target storage node primary key based on the primary key search result and the target stack pointer. Specifically, before or after the target stack pointer is created, the computing node may add a third read lock in a third read/write lock to the connection push-to-stack thread. Further, an push-to-stack success result is determined as the connection push-to-stack result of the connection push-to-stack thread when the target network connection information is successfully added to the target connection stack; and an push-to-stack failure result is determined as the connection push-to-stack result of the connection push-to-stack thread when the target network connection information is not added to the target connection stack.

Specifically, when the primary key search result of the target storage node primary key is acquired, and the target connection stack corresponding to the target storage node primary key is acquired based on the primary key search result and the target stack pointer, the computing node may acquire the primary key search result of the target storage node primary key. When the primary key search result is a search success result, the connection stack found based on the target stack pointer is determined as the target connection stack corresponding to the target storage node information, and push-to-stack processing is performed on the target network connection information, that is, the target network connection information is added to the target connection stack. In some embodiments, when a third read lock is added to the connection push-to-stack thread, the computing node unlocks the third read lock, and performs a process of determining the connection stack found based on the target stack pointer as the target connection stack corresponding to the target storage node information. The target storage node primary key is inserted into the connection mapping table when the primary key search result is a search failure result, and the target connection stack corresponding to the target storage node primary key is generated based on the target stack pointer.

Specifically, when the primary key search result is a search success result, the computing node may acquire a target connection quantity of the target connection stack; and when the target connection quantity is greater than or equal to a maximum stack connection quantity, determine that the target network connection information is not added to the target connection stack, and determine an push-to-stack failure result as a connection push-to-stack result of the connection push-to-stack thread; the maximum stack connection quantity being used for indicating a total quantity of network connection information allowed to be added to the target connection stack.

The computing node creates a connection stack instance when the primary key search result is a search failure result; the connection stack instance including a stack object and a second mutex lock; adds a primary write lock in a primary read/write lock to the connection push-to-stack thread; associatively inserts the connection stack instance and the target storage node primary key into the connection mapping table; deletes the connection stack instance when insertion fails, and performs the step of searching the connection mapping table for the target storage node primary key based on the target stack pointer; where the insertion failure indicates that the target storage node primary key is being inserted into another thread; because the connection push-to-stack thread carries the primary write lock, the target storage node primary key cannot be inserted into the connection push-to-stack thread in the connection mapping table again; the target storage node primary key may be searched for in the connection mapping table, and a target storage node primary key inserted by another thread may be found; therefore, fault tolerance of connection push-to-stack can be improved, and a connection mapping table exception caused by simultaneously inserting the target storage node primary key into multiple threads can be avoided, thereby improving security of connection push-to-stack; and determines the connection stack instance as the target connection stack corresponding to the target storage node primary key based on the target stack pointer when insertion succeeds. Further, after the target connection stack is determined, the computing node may unlock the primary write lock, and perform push-to-stack processing on the target network connection information, that is, write the target network connection information into the target connection stack.

Further, when performing push-to-stack processing on the target network connection information, the computing node may add a mutex lock to the connection push-to-stack thread, perform push-to-stack processing on the target network connection information in the connection push-to-stack thread that carries the mutex lock, and unlock the mutex lock carried in the connection push-to-stack thread when adding the target network connection information to the target connection stack.

In the present disclosure, protection is implemented for each thread, storage node, and the like based on a read/write lock and a mutex lock. When a read lock or a write lock in a read/write lock is added to a thread, or a mutex lock is added to the thread, after execution of the thread is completed, the lock added to the thread may be unlocked, so as to release a resource occupied by the lock and improve data management efficiency.

Specifically, the computing node may further traverse the target connection stack, and acquire connection push-to-stack time respectively corresponding to the N pieces of network connection information in the target connection stack. The computing node acquires system network time, and determines connection establishment duration respectively corresponding to the N pieces of network connection information according to the system network time and the connection push-to-stack time respectively corresponding to the N pieces of network connection information; counts a connection recycle quantity of target network connection information in N pieces of network connection information, where the target network connection information is network connection information whose connection establishment duration is greater than or equal to a connection recycle time threshold; the connection recycle quantity being k, and k being a positive integer; and sequentially performs out-of-stack processing on k pieces of network connection information from a top of the target connection stack.

In some embodiments, the computing node may perform out-of-stack processing on the k pieces of network connection information based on the mutex lock, that is, add the mutex lock before counting the target connection recycle quantity in the N pieces of network connection information, and unlock the mutex lock after performing out-of-stack processing on the k pieces of network connection information. The computing node may add a primary write lock before traversing the target connection stack, and unlock the primary write lock after performing out-of-stack processing on the k pieces of network connection information. The N pieces of network connection information in the target connection stack are essentially the same, and are all connections established between the computing node and the target storage node. In a process of data management, that is, in a process of acquiring service data from a storage node, the computing node continuously performs out-of-stack and push-to-stack processing on network connection information in the target connection stack, so that a location of network connection information included in the target connection stack in the target connection stack changes constantly. Therefore, network connection information with longer connection duration does not necessarily approach a bottom of the target connection stack, and network connection information with longer connection duration is always not out of the stack and recycled, which indicates that a change of the bottom of the target connection stack is relatively small, that is, network connection information at the bottom of the target connection stack may be not used and is in an idle connection status. Based on this feature, out-of-stack processing may be performed on k pieces of network connection information from the top of the target connection stack, and out-of-stack network connection information is recycled, so that network connection information that is idle in the target connection stack can be recycled as much as possible, and storage space required by the target connection stack is saved.

Figure 7:
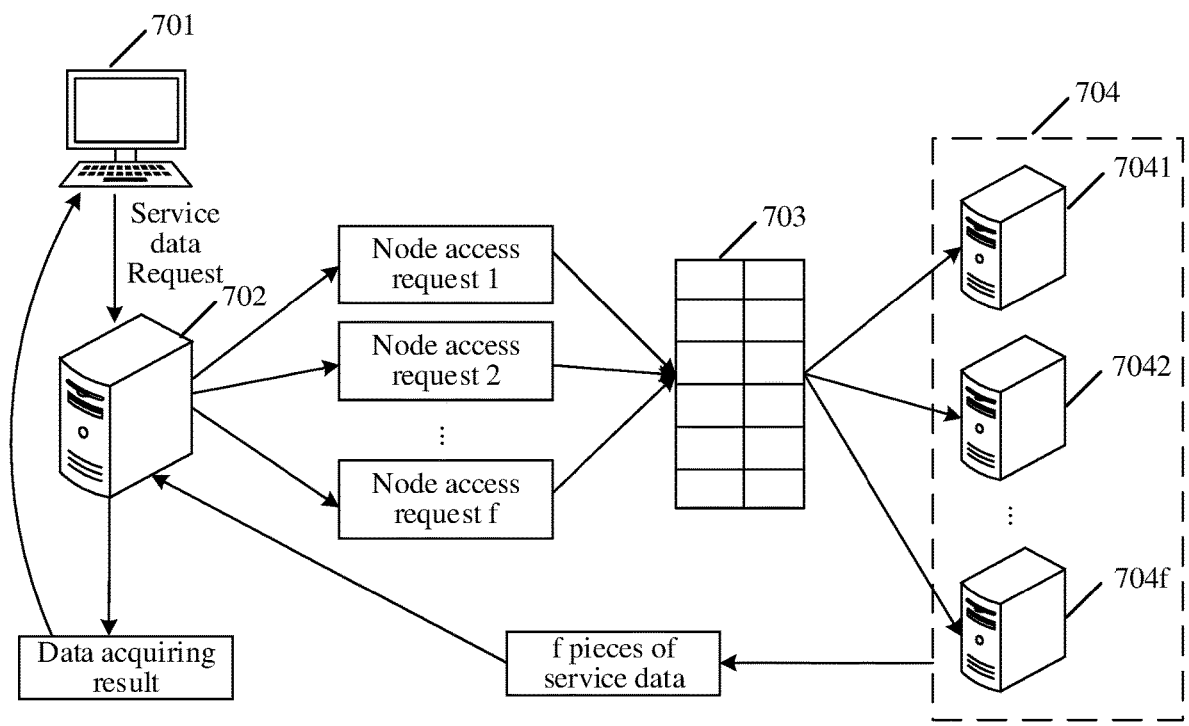
FIG. 7 is a schematic diagram of a data acquiring scenario according to an embodiment of the present disclosure.

Further, referring to FIG. 7, FIG. 7 is a schematic diagram of a data acquiring scenario according to an embodiment of the present disclosure. As shown in FIG. 7, user equipment 701 transmits a service data acquiring request to a computing node 702. The computing node 702 may parse the service data acquiring request to obtain f node access requests, such as a node access request 1, a node access request 2, and a node access request f. The computing node 702 may parse the service data acquiring request based on a storage node requested by the service data acquiring request. The computing node 702 may acquire, from a connection mapping table 703 based on the f node access requests, target storage nodes 704 respectively corresponding to the f node access requests, such as a target storage node 7041 corresponding to the node access request 1, a target storage node 7042 corresponding to the node access request 2, and a target storage node 704f corresponding to the node access request f, to separately obtain service data from the f target storage nodes 7042. For this process, references may be made to specific descriptions shown in FIG. 4 to FIG. 6, and details are not described herein again. The computing node 702 may combine the obtained f pieces of service data into a data acquiring result and transmit the data acquiring result to the user equipment 701.

Figure 8:
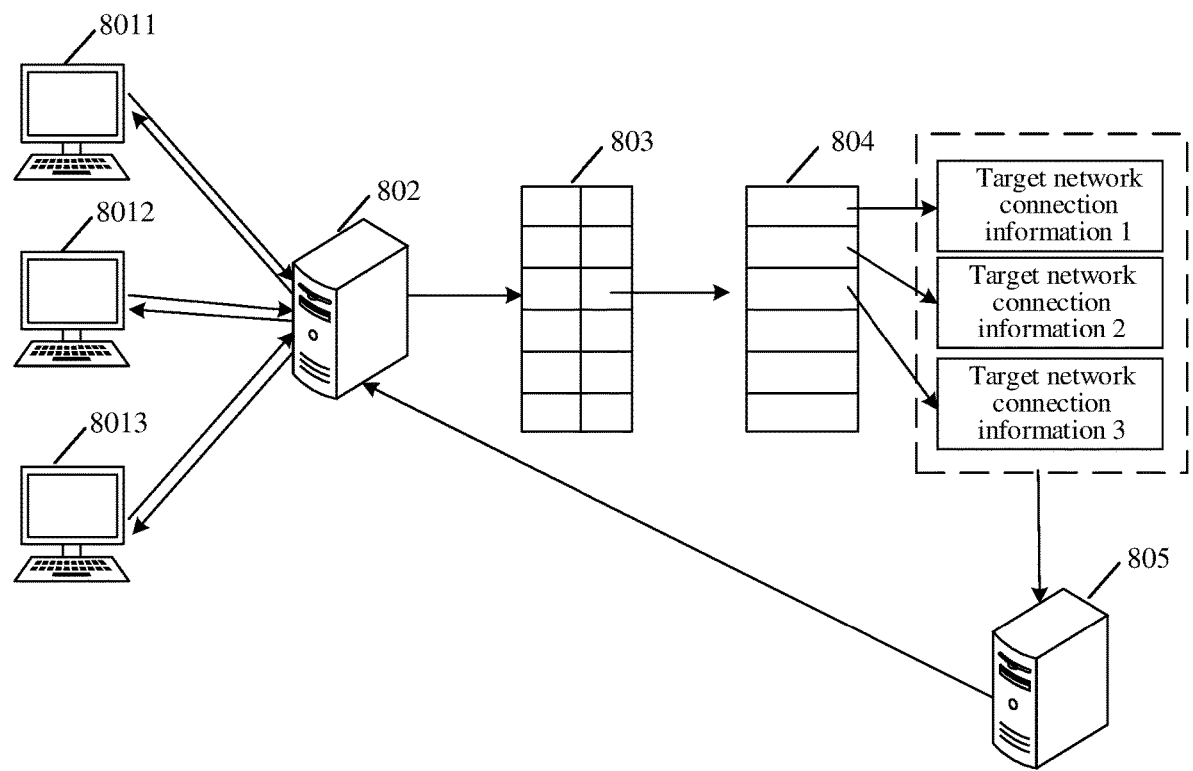
FIG. 8 is a schematic diagram of a multi-thread data acquiring scenario according to an embodiment of the present disclosure.

In some embodiments, referring to FIG. 8, FIG. 8 is a schematic diagram of a multi-thread data acquiring scenario according to an embodiment of the present disclosure. As shown in FIG. 8, it is assumed that a computing node 802 receives a service data acquiring request separately transmitted by user equipment 8011, user equipment 8012, and user equipment 8013. It is assumed that the service data acquiring request transmitted by each user equipment is a service data acquiring request for a target storage node A. The computing node 802 parses the service data acquiring request to obtain a node access request of the user equipment 8011 for the target storage node A, a node access request of the user equipment 8012 for the target storage node A, and a node access request of the user equipment 8013 for the target storage node A. The computing node 802 may traverse a connection mapping table 803 based on a target storage node primary key A corresponding to the target storage node A. For this process, refer to step S402 in FIG. 4.

Further, it is assumed that the computing node 802 finds a target connection stack 804 corresponding to the target storage node primary key A, and the computing node 802 may run, in parallel based on a read/write lock and a mutex lock, a connection acquiring thread corresponding to the user equipment 8011, a connection acquiring thread corresponding to the user equipment 8012, a connection acquiring thread corresponding to the user equipment 8013, and the like. That is, a process of performing step S403 in FIG.

4 for each node access request is run in parallel and independent of each other. For example, the computing node 802 obtains target network connection information 1 from the target connection stack 804 for the node access request 1 of the user equipment 8011. In this case, when the computing node 802 obtains the target network connection information from the target connection stack 804 for the node access request 2 of the user equipment 8012, the computing node 802 blocks, based on the read/write lock and the mutex lock, a connection acquiring thread associated with the user equipment 8012. When the computing node 802 performs out-of-stack processing on the target network connection information 1, the computing node 802 starts the connection acquiring thread associated with the user equipment 8012, performs out-of-stack processing on network connection information at the top of the target connection stack 804, and determines out-of-stack network connection information as target network connection information 2 corresponding to the user equipment 8012. Similarly, the computing node 802 may obtain, based on the read/write lock and the mutex lock, target network connection information 3 corresponding to the user equipment 8013.

Further, the computing node 802 may establish a target connection relationship 1 with the target storage node A based on the target network connection information 1, and acquire, based on the target connection relationship 1, service data 1 requested by the node access request 1 from the target storage node A; may establish a target connection relationship 2 with the target storage node A based on the target network connection information 2, and acquire, based on the target connection relationship 2, service data 2 requested by the node access request 2 from the target storage node A; and may establish a target connection relationship 3 with the target storage node A based on the target network connection information 3, and acquire, based on the target connection relationship 3, service data 3 requested by the node access request 3 (that is, the node access request transmitted by the user equipment 8013) from the target storage node A. The computing node 802 may transmit the service data 1 to the user equipment 8011, transmit the service data 2 to the user equipment 8012, and transmit the service data 3 to the user equipment 8013. In other words, the steps performed by the computing node 802 on each node access request are parallel and independent. When service data is acquired from the same storage node, the computing node 802 may also acquire the service data from the storage node in parallel based on different network connection information. If a conflict occurs in a step performed for each node access request in an execution process, blocking and running control may be implemented on each node access request based on a read/write lock and a mutex lock, so that the computing node can simultaneously implement a process of responding to multiple user equipment, and acquire different service data from the same storage node, thereby improving data transmission efficiency.

In some embodiments, the present disclosure may be applied to any application scenario in which a distributed database system may be used, for example, may be applied to a data acquiring scenario of an application program. For example, it is assumed that game data of a game application is stored in multiple storage nodes. When user equipment needs to acquire the game data, the user equipment may transmit a game data acquiring request to the computing node. The computing node performs steps shown in FIG. 4 based on the game data acquiring request to obtain target game data requested by the game data acquiring request, and transmits the target game data to the user equipment. The user equipment may perform user analysis based on the obtained target game data to obtain a user analysis result, and optimize the game application based on the user analysis result, such as updating a game playing method or adding a game prop. The user equipment may also perform analysis based on the obtained target game data to obtain a user distribution status, and may obtain a release operation status and the like of the game application based on the user distribution status. That is, the user equipment may transmit a game data acquiring request to the computing node based on an analysis requirement, acquire target game data requested by the game data acquiring request, and perform analysis based on the target game data to obtain an application analysis result required by the analysis requirement. Likewise, the present disclosure may be applied to any data acquiring scenario that uses a distributed database system.

In this embodiment of the present disclosure, the computing node receives the node access request for the target storage node, and acquires the target storage node primary key of the target storage node; traverses the connection mapping table based on the target storage node primary key; the connection mapping table including M storage node primary keys and connection stacks respectively corresponding to the M storage node primary keys, and M being a positive integer; one connection stack including N pieces of network connection information in an idle connection state; N being a natural number; the computing node acquires, in response to identifying a target connection stack corresponding to the target storage node primary key from the connection mapping table, target network connection information from N pieces of network connection information included in the target connection stack, establishes a target connection relationship with the target storage node based on the target network connection information, and acquires, from the target storage node based on the target connection relationship, service data requested by the node access request. In the foregoing process, a mapping table and a stack are introduced, and the computing node is associated with the storage node by using the mapping table, so that a connection between the computing node and each storage node can be managed, that is, multiple connection pools are managed, connections inside each connection pool point to the same storage node, and the connection pool is managed by using the stack. Each stack may manage multiple connections between the computing node and the storage node, so that the computing node can conveniently find a storage node that needs to be accessed, and acquire, from the stack, a connection used for accessing the storage node, thereby improving convenience and efficiency of data management. Further, the stack can be implemented by using dynamic arrays. In the case of dynamic arrays, the stack can be rapidly expanded to improve effectiveness and efficiency of connection mapping table management. In the present disclosure, a read operation is mainly involved, for example, a read operation on a connection mapping table. Therefore, in the present disclosure, use frequency of a read lock is greater than use frequency of a write lock, so as to reduce unnecessary blocking and improve overall performance.

In the present disclosure, when primary/secondary switching occurs to a storage node, that is, when a storage node to which a node name in the connection mapping table points changes, a storage node primary key corresponding to the node name in the connection mapping table and a connection stack are updated. The storage node that needs to be updated is recorded as a to-be-updated storage node, a storage node primary key corresponding to the to-be-updated storage node is recorded as a to-be-updated storage node primary key, and a connection stack corresponding to the to-be-updated storage node is recorded as a to-be-updated connection stack. Specifically, the computing node may start a node update thread, and add a write lock to a connection pool (that is, each connection stack), a waiting processing component, and the like; then add a mutex lock to the connection update thread, destroy the to-be-updated connection stack corresponding to the to-be-updated storage node, and unlock the mutex lock when the to-be-updated connection stack is destroyed successfully; delete the to-be-updated storage node primary key, generate a replacement storage node primary key based on the to-be-updated node name corresponding to the to-be-updated storage node and a node version number corresponding to a replacement storage node, create a replacement connection stack, and associatively insert the replacement storage node primary key and the replacement connection stack into the connection mapping table; and unlock a write lock associated with the connection pool (that is, each connection stack), the waiting processing component, and the like.

Further, a performance test is performed on the present disclosure by using an architecture with one computing node and 16 storage nodes. In one aspect, a point query is used for performing pressure measurement on a central processing unit (CPU) of the computing node. For example, data in a table is 10 G and a memory of the computing node is 15 G. All operations are cached in the memory (full cache). Queries-per-second (QPS) and 99th percentile (response time in the 99% position in ascending order of response time) are analyzed, to obtain a QPS indicator shown in the following Table 1:

TABLE 1

QPS Indicator

| | Solution | |
|---|---|---|
| Quantity of threads | Solution 1 (based on the hash table) | The present disclosure |
| 50 | 57168.74 | 57670.93 |
| 100 | 99769.45 | 99937.68 |
| 200 | 122404.09 | 123153.73 |
| 300 | 124644.19 | 125723.51 |

When the quantity of threads reaches 200, a CPU occupation rate is nearly 100%. In this case, the CPU is fully loaded. It can be learned from Table 1 that in the present disclosure, overall system performance is improved on the basis of Solution 1. Solution 1 refers to a method for managing a connection pool by using a hash table, that is, storing an entire connection pool by using one hash table. Further, refer to the 99th percentile indicator shown in Table 2.

TABLE 2

99th percentile indicator

| | Solution | |
|---|---|---|
| Quantity of threads | Solution 1 (based on the hash table) | The present disclosure |
| 50 | 1.04 | 1.04 |
| 100 | 1.96 | 1.96 |

TABLE 2-continued

99th percentile indicator

| | Solution | |
|---|---|---|
| Quantity of threads | Solution 1 (based on the hash table) | The present disclosure |
| 200 | 8.13 | 7.84 |
| 300 | 16.41 | 14.73 |

It may be learned from Table 2 that, when the quantity of threads is relatively large, a delay comparison solution 1 of the present disclosure on the 99th percentile indicator decreases greatly. When there are 300 threads, the 99th percentile indicator decreases by 10.24% compared with Solution 1, and it can be learned that performance jitter is relatively small and overall service quality is relatively high in the present disclosure.

In one aspect, when concurrent requests of an application layer exceed a capacity of a connection pool, performance of the connection pool is tested. Assuming that a maximum capacity of a single connection pool is controlled as a single variable, the performance test is performed under fixed 300 concurrent full cache requests of the application layer. It is assumed that a maximum capacity of a single connection pool is 10. In a case of 16 storage nodes, the connection pool accommodates up to 160 threads in total. In this case, 300 threads are used for pressure measurement, and many threads enter a blocking state, which is specifically shown in Table 3.

TABLE 3

QPS data

| | solution | |
|---|---|---|
| Maximum capacity | Solution 1 (based on the hash table) | The present disclosure |
| 5 | 83200.37 | 98597.90 |
| 10 | 98681.96 | 117253.38 |
| 20 | 124437.48 | 125411.6 |
| 50 | 124804.67 | 125407.97 |
| 100 | 124912.36 | 125323.45 |
| 200 | 124167.46 | 125443.05 |
| 300 | 124892.4 | 125521.46 |
| 500 | 124543.59 | 125309.89 |

As shown in Table 3, in cases that the maximum capacity of the connection pool is 5 and 10, the QPS in the present disclosure increases by about 20% on the basis of Solution 1. It may be learned that when the connection pool capacity is a bottleneck, a higher degree of concurrency can be effectively implemented in the present disclosure.

In one aspect, when a full cache is used for point query based on a primary key and a CPU is fully loaded, time that each function occupies a CPU in a running process is calculated. Specifically, a percentage of operations related to the mutex lock and the read/write lock in the entire running time may be acquired, which is specifically shown in Table 4.

TABLE 4

| | Percentage of time occupied by running time | | | |
|---|---|---|---|---|
| | Mutex lock | Search for a thread at a system bottom layer (pthread_getspecific) | Read/write lock | Total |
| Solution 1 | 0.355996% | 0.060372% | N/A | 0.416368% |
| The present disclosure | 0.138516% | 0.07392% | 0.00003% | 0.212466% |

It may be learned from Table 4 that the solution used in the present disclosure can greatly reduce CPU occupation time and improve system performance.

In summary, it can be learned that the solution in the present disclosure has a relatively high concurrent capability and a relatively low delay, and has relatively large improvement.

Figure 9:
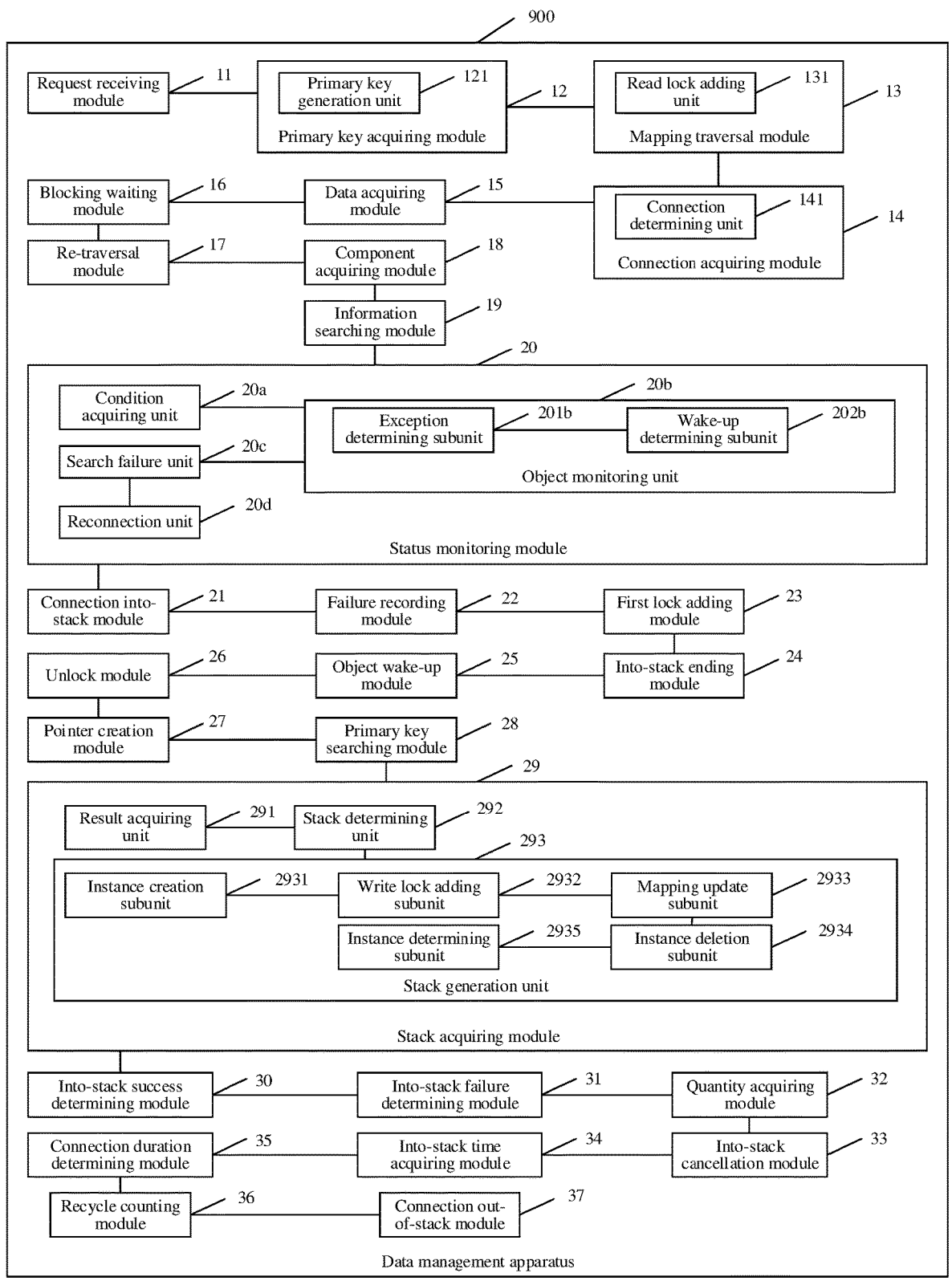
FIG. 9 is a schematic diagram of a data management apparatus according to an embodiment of the present disclosure.
Figure 10:
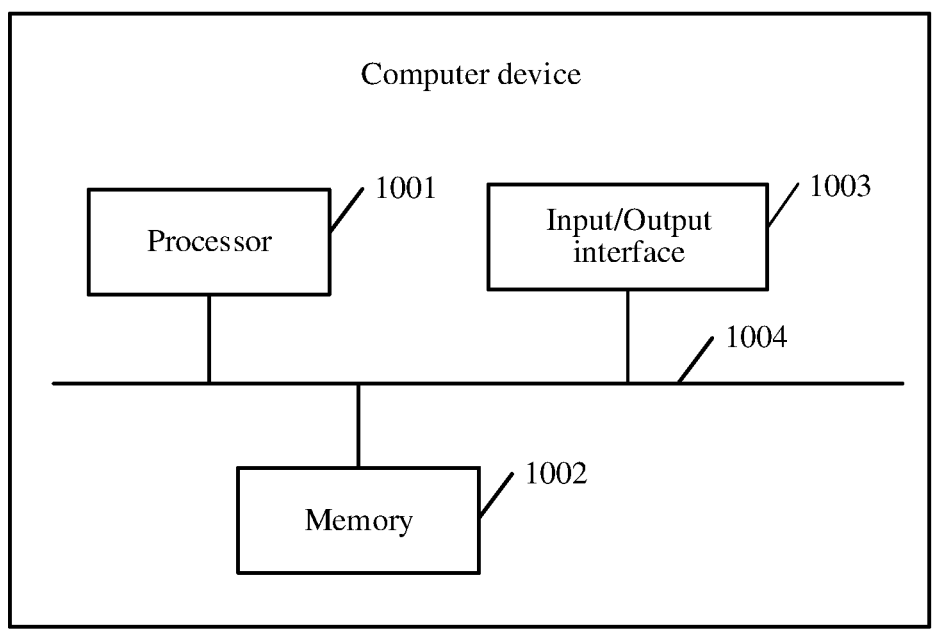
FIG. 10 is a schematic structural diagram of a computer device according to an embodiment of the present disclosure.

Further, referring to FIG. 9, FIG. 9 is a schematic diagram of a data management apparatus according to an embodiment of the present disclosure. The data management apparatus may be a computer readable instruction (including program code and the like) that runs in a computer device. For example, the data management apparatus may be application software. The apparatus may be configured to perform corresponding steps in the method provided in the embodiment of the present disclosure. As shown in FIG. 9, the data management apparatus 900 may be applied to the computer device in the embodiment corresponding to FIG. 4. Specifically, the apparatus may include: a request receiving module 11, a primary key acquiring module 12, a mapping traversal module 13, a connection acquiring module 14, and a data acquiring module 15.

The request receiving module 11 is configured to receive a node access request for a target storage node;
the primary key acquiring module 12 is configured to acquire a target storage node primary key of the target storage node;
the mapping traversal module 13 is configured to traverse a connection mapping table based on the target storage node primary key; the connection mapping table including M storage node primary keys and connection stacks respectively corresponding to the M storage node primary keys, and M being a positive integer; one connection stack including N pieces of network connection information in an idle connection state; N being a natural number;
the connection acquiring module 14 is configured to: acquire, in response to identifying a target connection stack corresponding to the target storage node primary key from the connection mapping table, target network connection information from N pieces of network connection information included in the target connection stack; and
the data acquiring module 15 is configured to: establish a target connection relationship with the target storage node based on the target network connection information, and acquire, from the target storage node based on the target connection relationship, service data requested by the node access request.

The primary key acquiring module 12 includes:
a primary key generation unit 121, configured to: acquire a target node name and a target node version number of the target storage node, and combine the target node name and the target node version number to generate the target storage node primary key of the target storage node.

The connection acquiring module 14 includes:
a connection determining unit 141, configured to: perform, when the target connection stack corresponding to the target storage node primary key is found from the connection mapping table, out-of-stack processing on network connection information located at a top of the stack from the N pieces of network connection information included in the target connection stack, and determine the out-of-stack network connection information as the target network connection information.

The mapping traversal module 13 includes:
a read lock adding unit 131, configured to: add a first read lock in a first read/write lock to a connection acquiring thread, and searching the connection mapping table for the target storage node primary key based on the first read lock; and the apparatus 800 further includes:
a blocking waiting module 16, configured to: perform an unlock operation on the first read lock, and add a blocking waiting thread to the connection acquiring thread when the target connection stack corresponding to the target storage node primary key is not traversed/found from the connection mapping table; the blocking waiting thread being in a blocking running state;
a re-traversal module 17, configured to: invoke the connection acquiring thread to traverse the connection mapping table again based on the target storage node primary key when the blocking waiting thread recovers from the blocking running state to a blocking release state.

The apparatus 800 further includes:
a component acquiring module 18, configured to: acquire a waiting processing component, and add a second read lock in a second read/write lock associated with the waiting processing component to the blocking waiting thread; the waiting processing component including storage node information and the second read/write lock;
an information searching module 19, configured to: search for target storage node information corresponding to the target storage node primary key based on the waiting processing component, and when the target storage node information is not found, unlock the second read lock in the second read/write lock to determine that the target connection stack corresponding to the target storage node is not traversed/found in the connection mapping table; and
a status monitoring module 20, configured to: monitor a blocking status of the blocking waiting thread when the target storage node information is found; the blocking status including the blocking running state or the blocking release state.

The status monitoring module 20 includes:
a condition acquiring unit 20a, configured to acquire a blocking condition structure when the target storage node information is found; the blocking condition structure including a blocking condition object used for representing the blocking status and a first mutex lock;
an object monitoring unit 20b, configured to: add the first mutex lock in the blocking condition structure to the blocking waiting thread, acquire an object status of the blocking condition object from the blocking waiting thread that carries the first mutex lock, and when the object status is obtained, unlock the first mutex lock in the blocking waiting thread;

a searching failure unit 20*c*, configured to: determine that the target storage node is not found when the object status of the blocking condition object is an object abnormal state; and a reconnection unit 20*d*, configured to: invoke the connection acquiring thread when the object status of the blocking condition object is an object waking state, and in the connection acquiring thread, traverse the connection mapping table again based on the target storage node primary key.

The object monitoring unit 20*b* includes:

an exception determining subunit 201*b*, configured to: determine, in the blocking waiting thread that carries the first mutex lock, that the object status of the blocking condition object is the object abnormal state when a thread exception occurs in the blocking waiting thread; and a wake-up determining subunit 202*b*, configured to: determine that the object status of the blocking condition object is the object wake-up state when the blocking waiting thread acquires, within a blocking waiting time, a wake-up signal of a connection push-to-stack thread for the blocking condition object.

The apparatus 800 further includes:

a connection push-to-stack module 21, configured to: acquire a waiting processing component when service data requested by a node access request is obtained, invoke a connection push-to-stack thread for target network connection information, add the target network connection information to a target connection stack corresponding to the target storage node information based on a connection push-to-stack thread, and acquire a connection push-to-stack result of the connection push-to-stack thread;

a failure recording module 22, configured to: when the connection push-to-stack result of the connection push-to-stack thread is an push-to-stack failure result, record the push-to-stack failure result;

a first lock adding module 23, configured to: add a second read lock in a second read/write lock associated with the waiting processing component to the connection push-to-stack thread when the connection push-to-stack result of the connection push-to-stack thread is an push-to-stack success result; the waiting processing component including storage node information and the second read/write lock;

an push-to-stack ending module 24, configured to: search for the target storage node information based on the waiting processing component, and end the connection push-to-stack thread when the target storage node information is not found; the target storage node information referring to node information of the target storage node;

an unlocking module 26, configured to: invoke the unlocking module 26 based on the push-to-stack ending module 24, and unlock a second read lock after the connection push-to-stack thread ends; and an object wake-up module 25, configured to: when the target storage node information is found, add the first mutex lock in the blocking condition structure to the connection push-to-stack thread, initiate a wake-up signal for the blocking condition object in the blocking condition structure, and unlock the first mutex lock associated with the connection push-to-stack thread;

the unlocking module 26 being further configured to: invoke the unlocking module 26 based on the object wake-up module 25, and unlock the second read lock after the first mutex lock associated with the connection push-to-stack thread is unlocked.

The apparatus 800 further includes:

a pointer creation module 27, configured to: invoke a connection push-to-stack thread for the target network connection information when the service data requested by the node access request is obtained, create a target stack pointer based on the connection push-to-stack thread, and acquire the target storage node primary key corresponding to the target network connection information;

a primary key searching module 28, configured to search the connection mapping table for the target storage node primary key based on the target stack pointer;

a stack acquiring module 29, configured to: acquire a primary key search result of the target storage node primary key, and acquire the target connection stack corresponding to the target storage node primary key based on the primary key search result and the target stack pointer;

an push-to-stack success determining module 30, configured to: determine an push-to-stack success result as the connection push-to-stack result of the connection push-to-stack thread when the target network connection information is successfully added to the target connection stack; and an push-to-stack failure determining module 31, configured to: determine an push-to-stack failure result as the connection push-to-stack result of the connection push-to-stack thread when the target network connection information is not added to the target connection stack.

The stack acquiring module 29 includes:

a result acquiring unit 291, configured to acquire the primary key search result of the target storage node primary key;

a stack determining unit 292, configured to: determine the connection stack found based on the target stack pointer as the target connection stack corresponding to the target storage node primary key when the primary key search result is a search success result; and a stack generation unit 293, configured to: insert the target storage node primary key into the connection mapping table when the primary key search result is a search failure result, and generate the target connection stack corresponding to the target storage node primary key based on the target stack pointer.

The stack generation unit 293 includes:

an instance creation subunit 2931, configured to: create a connection stack instance when the primary key search result is a search failure result; the connection stack instance including a stack object and a second mutex lock;

a write lock adding subunit 2932, configured to add a primary write lock in a primary read/write lock to the connection push-to-stack thread;

a mapping update subunit 2933, configured to associatively insert the connection stack instance and the target storage node primary key into the connection mapping table;

an instance deletion subunit 2934, configured to: delete the connection stack instance when insertion fails, and perform the step of searching the connection mapping table for the target storage node primary key based on the target stack pointer; and an instance determining subunit 2935, configured to: determine the connection stack instance as the target connection stack corresponding to the target storage node primary key based on the target stack pointer when insertion succeeds.

The apparatus 800 further includes:

a quantity acquiring module 32, configured to acquire a target connection quantity of the target connection stack; and an push-to-stack cancellation module 33, configured to: determine that the target network connection information is not added to the target connection stack when the target connection quantity is greater than or equal to a maximum stack connection quantity; the maximum stack connection quantity being used for indicating a total quantity of network connection information capable of being added to the target connection stack.

The apparatus 800 further includes:

an push-to-stack time acquiring module 34, configured to: traverse the target connection stack, and acquire connection push-to-stack time respectively corresponding to the N pieces of network connection information in the target connection stack;

a connection duration determining module 35, configured to: acquire system network time, and determine connection establishment duration respectively corresponding to the N pieces of network connection information according to the system network time and the connection push-to-stack time respectively corresponding to the N pieces of network connection information;

a recycle counting module 36, configured to: count a connection recycle quantity of network connection information whose connection establishment duration is greater than or equal to a connection recycle time threshold in the N pieces of network connection information; the connection recycle quantity being k, and k being a positive integer; and a connection out-of-stack module 37, configured to sequentially perform out-of-stack processing on k pieces of network connection information from a top of the target connection stack.

An embodiment of the present disclosure provides a data management apparatus. The apparatus may run on a computing node, receive a node access request for a target storage node, and acquire a target storage node primary key of the target storage node; traverse a connection mapping table based on the target storage node primary key; the connection mapping table including M storage node primary keys and connection stacks respectively corresponding to the M storage node primary keys, and M being a positive integer; one connection stack including N pieces of network connection information in an idle connection state; N being a natural number; acquire, in response to identifying a target connection stack corresponding to the target storage node primary key from the connection mapping table, target network connection information from N pieces of network connection information included in the target connection stack, establish a target connection relationship with the target storage node based on the target network connection information, and acquire, from the target storage node based on the target connection relationship, service data requested by the node access request. In the foregoing process, a mapping table and a stack are introduced, and the computing node is associated with the storage node by using the mapping table, so that a connection between the computing node and each storage node can be managed, that is, multiple connection pools are managed, connections inside each connection pool point to the same storage node, and the connection pool is managed by using the stack. Each stack may manage multiple connections between the computing node and the storage node, so that the computing node can conveniently find a storage node that needs to be accessed, and acquire, from the stack, a connection used for accessing the storage node, thereby improving convenience and efficiency of data management.

The term module (and other similar terms such as sub-module, unit, subunit, etc.) in this disclosure may refer to a software module, a hardware module, or a combination thereof. A software module (e.g., computer program) may be developed using a computer programming language. A hardware module may be implemented using processing circuitry and/or memory. Each module can be implemented using one or more processors (or processors and memory). Likewise, a processor (or processors and memory) can be used to implement one or more modules. Moreover, each module can be part of an overall module that includes the functionalities of the module.

Referring to FIG. 9, FIG. 9 is a schematic structural diagram of a computer device according to an embodiment of the present disclosure. As shown in FIG. 9, the computer device in this embodiment of the present disclosure may include: one or more processors 901, a memory 902, and an input/output interface 903. The processor 901, the memory 902, and the input/output interface 903 are connected by using a bus 904. The memory 902 is configured to store a computer program, where the computer program includes computer readable instructions, and the input/output interface 903 is configured to receive data and output data, such as data exchange between a computing node and a storage node, or data exchange between user equipment and the computing node. The processor 901 is configured to execute the program instructions stored in the memory 902.

The processor 901 may perform the following operations:

receiving a node access request for a target storage node, and acquiring a target storage node primary key of the target storage node;

traversing a connection mapping table based on the target storage node primary key; the connection mapping table including M storage node primary keys and connection stacks respectively corresponding to the M storage node primary keys, and M being a positive integer; one connection stack including N pieces of network connection information in an idle connection state; N being a natural number;

acquiring, in response to identifying a target connection stack corresponding to the target storage node primary key from the connection mapping table, target network connection information from N pieces of network connection information included in the target connection stack, establishing a target connection relationship with the target storage node based on the target network connection information, and acquiring, from the target storage node based on the target connection relationship, service data requested by the node access request.

In some feasible implementations, the processor 901 may be a central processing unit (CPU), and the processor may be another general purpose processor, a digital signal processor (DSP), an application-specific integrated circuit (ASIC), a field programmable gate array (FPGA,) or another programmable logic device, a discrete gate or transistor logic device, a discrete hardware component, or the like. The general purpose processor may be a microprocessor, or the processor may be any suitable processor.

The memory 902 may include a read-only memory and a random access memory, and provides an instruction and data for the processor 901 and the input/output interface 903. A part of the memory 902 may further include a non-volatile random access memory. For example, the memory 902 may further store information about a device type.

In specific implementation, the computer device may execute, by using each built-in function module of the computer device, the implementation provided in the steps in FIG. 4. For details, refer to the implementation provided in the steps in FIG. 4, and details are not described herein again.

An embodiment of the present disclosure provides a computer device, including: a processor, an input/output interface, and a memory. The processor acquires computer readable instructions in the memory, performs steps of the method shown in FIG. 4, and performs a data management operation. This embodiment of the present disclosure implements receiving a node access request for a target storage node, and acquiring a target storage node primary key of the target storage node; traversing a connection mapping table based on the target storage node primary key; the connection mapping table including M storage node primary keys and connection stacks respectively corresponding to the M storage node primary keys, and M being a positive integer; one connection stack including N pieces of network connection information in an idle connection state; N being a natural number; acquiring, in response to identifying a target connection stack corresponding to the target storage node primary key from the connection mapping table, target network connection information from N pieces of network connection information included in the target connection stack, establishing a target connection relationship with the target storage node based on the target network connection information, and acquiring, from the target storage node based on the target connection relationship, service data requested by the node access request. In the foregoing process, a mapping table and a stack are introduced, and the computing node is associated with the storage node by using the mapping table, so that a connection between the computing node and each storage node can be managed, that is, multiple connection pools are managed, connections inside each connection pool point to the same storage node, and the connection pool is managed by using the stack. Each stack may manage multiple connections between the computing node and the storage node, so that the computing node can conveniently find a storage node that needs to be accessed, and acquire, from the stack, a connection used for accessing the storage node, thereby improving convenience and efficiency of data management.

An embodiment of the present disclosure further provides a computer readable storage medium. The computer readable storage medium stores computer readable instructions. The computer readable instructions are suitable for a processor to load and execute the data management method provided in the steps in FIG. 4. For details, refer to the implementation provided in the steps in FIG. 4. Details are not described herein again. In addition, the description of beneficial effects of the same method is not described herein again. For technical details that are not disclosed in the computer readable storage medium embodiments of the present disclosure, refer to the descriptions of the method embodiments of the present disclosure. As an example, the computer readable instructions may be deployed to be executed on one computer device, or executed on multiple computer devices located at one location, or executed on multiple computer devices distributed at multiple locations and interconnected by using a communication network.

The foregoing computer readable storage medium may be the data management apparatus provided in any one of the foregoing embodiments or an internal storage unit of the foregoing computer device, such as a hard disk or a memory of the computer device. The computer readable storage medium may also be an external storage device of the computer device, for example, a plug type hard disk, a smart media card (SMC), a secure digital (SD) card, and a flash card that are configured on the computer device. Further, the computer readable storage medium may further include an internal storage unit of the computer device and an external storage device. The computer readable storage medium is configured to store the computer readable instructions and other readable instructions and data required by the computer device. The computer readable storage medium may be further configured to temporarily store data that has been or is to be output.

An embodiment of the present disclosure provides a computer program product or a computer program. The computer program product or the computer program includes computer readable instructions, and the computer readable instructions are stored in a computer readable storage medium. A processor of a computer device reads the computer readable instructions from the computer readable storage medium. The processor executes the computer readable instructions, so that the computer device executes the method provided in the various optional manners in FIG. 4. A mapping table and a stack are introduced, and the computing node is associated with the storage node by using the mapping table, so that a connection between the computing node and each storage node can be managed, that is, multiple connection pools are managed, connections inside each connection pool point to the same storage node, and the connection pool is managed by using the stack. Each stack may manage multiple connections between the computing node and the storage node, so that the computing node can conveniently find a storage node that needs to be accessed, and acquire, from the stack, a connection used for accessing the storage node, thereby improving convenience and efficiency of data management.

The terms "first" and "second" in the specification, claims, and accompanying drawings of the embodiments of the present disclosure are used for distinguishing between different objects, and are not used for describing a specific sequence. In addition, the term "include" and any variant thereof are intended to cover a non-exclusive inclusion. For example, a process, method, apparatus, product, or device that includes a series of steps or units is not limited to the listed steps or modules; and instead, further optionally includes a step or module that is not listed, or further optionally includes another step or unit that is intrinsic to the process, method, apparatus, product, or device.

A person of ordinary skill in the art may be aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. Whether the functions are executed in a mode of hardware or software depends on particular applications and design constraint conditions of the technical solutions. Those skilled in the art may use different methods to implement the described functions for each particular application, but such implementation is not to be considered beyond the scope of the present disclosure.

The method and the related apparatus provided in the embodiments of the present disclosure are described with reference to a flowchart and/or a schematic structural diagram of the method provided in the embodiments of the present disclosure. Specifically, each process and/or block of the method flowchart and/or the schematic structural diagram of the method may be implemented by a computer readable instruction, and a combination of the process and/or block in the flowchart and/or block diagram. These computer readable instructions may be provided to a general-purpose computer, a dedicated computer, an embedded processor, or a processor of another programmable data management device to generate a machine, so that the instructions executed by the computer or the processor of the another programmable data management device generate an apparatus for implementing a specific function in one or more processes in the flowcharts and/or in one or more blocks in the schematic structural diagram. These computer readable instructions may also be stored in a computer readable memory that can instruct the computer or any other programmable data management device to work in a specific manner, so that the instructions stored in the computer readable memory generate an artifact that includes an instruction apparatus. The instruction apparatus implements a specific function in one or more processes in the flowcharts and/or in one or more blocks in the schematic structural diagram. These computer readable instructions may also be loaded onto a computer or another programmable data management device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the schematic structural diagram.

The steps of the method in the embodiments of the present disclosure may be adjusted in terms of sequence, and merged or deleted according to an actual requirement.

The modules in the apparatus in the embodiment of the present disclosure may be combined, divided, or deleted according to an actual requirement.

What is disclosed above is merely exemplary embodiments of the present disclosure, and certainly is not intended to limit the scope of the claims of the present disclosure. Therefore, equivalent variations made in accordance with the claims of the present disclosure shall fall within the scope of the present disclosure.

What is claimed is:

1. A data management method, performed by a computing node, the method comprising:
    receiving a node access request for a target storage node, and acquiring a target storage node primary key of the target storage node;
    traversing a connection mapping table based on the target storage node primary key, the connection mapping table comprising M storage node primary keys and connection stacks respectively corresponding to the M storage node primary keys, and M being a positive integer; one connection stack comprising N pieces of network connection information in an idle connection state, and N being a natural number; and
    acquiring, in response to identifying a target connection stack corresponding to the target storage node primary key from the connection mapping table, target network connection information from N pieces of network connection information comprised in the target connection stack, establishing a target connection relationship with the target storage node based on the target network connection information, and acquiring, from the target storage node based on the target connection relationship, service data requested by the node access request.

2. The method according to claim 1, wherein the acquiring a target storage node primary key of the target storage node comprises:
    acquiring a target node name and a target node version number of the target storage node; and
    combining the target node name and the target node version number to generate the target storage node primary key of the target storage node.

3. The method according to claim 1, wherein the acquiring, in response to identifying a target connection stack corresponding to the target storage node primary key from the connection mapping table, target network connection information from N pieces of network connection information comprised in the target connection stack comprises:
    performing, when the target connection stack corresponding to the target storage node primary key is found from the connection mapping table, out-of-stack processing on network connection information located at a top of the stack from the N pieces of network connection information comprised in the target connection stack, and determining the out-of-stack network connection information as the target network connection information.

4. The method according to claim 1, wherein the traversing a connection mapping table based on the target storage node primary key comprises:
    adding a first read lock in a first read/write lock to a connection acquiring thread, and searching the connection mapping table for the target storage node primary key based on the first read lock; and
    the method further comprises:
    performing an unlock operation on the first read lock, and adding a blocking waiting thread to the connection acquiring thread when the target connection stack corresponding to the target storage node primary key is not found from the connection mapping table, the blocking waiting thread being in a blocking running state; and
    invoking the connection acquiring thread to traverse the connection mapping table again based on the target storage node primary key when the blocking waiting thread recovers from the blocking running state to a blocking release state.

5. The method according to claim 4, wherein the method further comprises:
    acquiring a waiting processing component, and adding a second read lock in a second read/write lock associated with the waiting processing component to the blocking waiting thread; the waiting processing component comprising storage node information and the second read/write lock;
    searching for target storage node information corresponding to the target storage node primary key based on the waiting processing component, and when the target storage node information is not found, unlocking the second read lock in the second read/write lock to determine that the target connection stack corresponding to the target storage node is not traversed in the connection mapping table; and
    monitoring a blocking status of the blocking waiting thread when the target storage node information is found; the blocking status comprising the blocking running state or the blocking release state.

6. The method according to claim 5, wherein the monitoring a blocking status of the blocking waiting thread when the target storage node information is found comprises:
- acquiring a blocking condition structure when the target storage node information is found; the blocking condition structure comprising a blocking condition object used for representing the blocking status and a first mutex lock;
- adding the first mutex lock in the blocking condition structure to the blocking waiting thread, acquiring an object status of the blocking condition object from the blocking waiting thread that carries the first mutex lock, and when the object status is obtained, unlocking the first mutex lock in the blocking waiting thread;
- determining that the target storage node is not found when the object status of the blocking condition object is an object abnormal state; and
- invoking the connection acquiring thread when the object status of the blocking condition object is an object waking state, and in the connection acquiring thread, traversing the connection mapping table again based on the target storage node primary key.

7. The method according to claim 6, wherein the acquiring an object status of the blocking condition object from the blocking waiting thread that carries the first mutex lock comprises:
- determining, in the blocking waiting thread that carries the first mutex lock, that the object status of the blocking condition object is the object abnormal state when a thread exception occurs in the blocking waiting thread; and
- determining that the object status of the blocking condition object is the object wake-up state when the blocking waiting thread acquires, within a blocking waiting time, a wake-up signal of a connection push-to-stack thread for the blocking condition object.

8. The method according to claim 1, wherein the method further comprises:
- acquiring a waiting processing component when the service data requested by the node access request is obtained, invoking a connection push-to-stack thread for the target network connection information, adding the target network connection information to the target connection stack corresponding to the target storage node information based on the connection push-to-stack thread, and acquiring a connection push-to-stack result of the connection push-to-stack thread;
- adding a second read lock in a second read/write lock associated with the waiting processing component to the connection push-to-stack thread when the connection push-to-stack result of the connection push-to-stack thread is an push-to-stack success result; the waiting processing component comprising storage node information and the second read/write lock;
- searching for the target storage node information based on the waiting processing component, ending the connection push-to-stack thread when the target storage node information is not found, and unlocking the second read lock; the target storage node information referring to node information of the target storage node; and
- adding a first mutex lock in a blocking condition structure to the connection push-to-stack thread when the target storage node information is found, initiating a wake-up signal for a blocking condition object in the blocking condition structure, unlocking the first mutex lock associated with the connection push-to-stack thread, and unlocking the second read lock.

9. The method according to claim 1, wherein the method further comprises:
- invoking a connection push-to-stack thread for the target network connection information when the service data requested by the node access request is obtained, creating a target stack pointer based on the connection push-to-stack thread, and acquiring the target storage node primary key corresponding to the target network connection information;
- searching the connection mapping table for the target storage node primary key based on the target stack pointer;
- acquiring a primary key search result of the target storage node primary key, and acquiring the target connection stack corresponding to the target storage node primary key based on the primary key search result and the target stack pointer; and
- determining an addition result of the target network connection information in the target connection stack as a connection push-to-stack result of the connection push-to-stack thread.

10. The method according to claim 9, wherein the method further comprises:
- adding a third read lock in a third read/write lock to the connection push-to-stack thread; and
- unlocking the third read lock when the primary key search result is a search success result, and determining the connection stack found based on the target stack pointer as the target connection stack corresponding to the target storage node information.

11. The method according to claim 9, wherein the determining an addition result of the target network connection information in the target connection stack as a connection push-to-stack result of the connection push-to-stack thread comprises:
- determining an push-to-stack success result as the connection push-to-stack result of the connection push-to-stack thread when the target network connection information is successfully added to the target connection stack; and
- determining an push-to-stack failure result as the connection push-to-stack result of the connection push-to-stack thread when the target network connection information is not added to the target connection stack.

12. The method according to claim 11, wherein the method further comprises:
- acquiring a target connection quantity of the target connection stack; and
- determining that the target network connection information is not added to the target connection stack when the target connection quantity is greater than or equal to a maximum stack connection quantity; the maximum stack connection quantity indicating a total quantity of network connection information allowed to be added to the target connection stack.

13. The method according to claim 9, wherein the acquiring a primary key search result of the target storage node primary key, and acquiring the target connection stack corresponding to the target storage node primary key based on the primary key search result and the target stack pointer comprises:
- acquiring the primary key search result of the target storage node primary key;
- determining the connection stack found based on the target stack pointer as the target connection stack corresponding to the target storage node primary key when the primary key search result is a search success result; and inserting the target storage node primary key into the connection mapping table when the primary key search result is a search failure result, and generating the target connection stack corresponding to the target storage node primary key based on the target stack pointer.

14. The method according to claim 13, wherein the inserting the target storage node primary key into the connection mapping table when the primary key search result is a search failure result, and generating the target connection stack corresponding to the target storage node primary key based on the target stack pointer comprises:

creating a connection stack instance when the primary key search result is a search failure result; the connection stack instance comprising a stack object and a second mutex lock;

adding a primary write lock in a primary read/write lock to the connection push-to-stack thread;

associatively inserting the connection stack instance and the target storage node primary key into the connection mapping table;

deleting the connection stack instance when insertion fails, and performing the operation of searching the connection mapping table for the target storage node primary key based on the target stack pointer; and determining the connection stack instance as the target connection stack corresponding to the target storage node primary key based on the target stack pointer when insertion succeeds.

15. The method according to claim 1, wherein the method further comprises:

traversing the target connection stack, and acquiring connection push-to-stack time respectively corresponding to the N pieces of network connection information in the target connection stack;

acquiring system network time, and determining connection establishment duration respectively corresponding to the N pieces of network connection information according to the system network time and the connection push-to-stack time respectively corresponding to the N pieces of network connection information;

counting a connection recycle quantity of network connection information whose connection establishment duration is greater than or equal to a connection recycle time threshold in the N pieces of network connection information; the connection recycle quantity being k, and k being a positive integer; and sequentially performing out-of-stack processing on k pieces of network connection information from a top of the target connection stack.

16. A data management apparatus, the apparatus comprising a memory and one or more processors, the memory storing computer readable instructions; and when executing the computer readable instructions, the one or more processors are configured to implement:

receiving a node access request for a target storage node, and acquiring a target storage node primary key of the target storage node;

traversing a connection mapping table based on the target storage node primary key, the connection mapping table comprising M storage node primary keys and connection stacks respectively corresponding to the M storage node primary keys, and M being a positive integer;

one connection stack comprising N pieces of network connection information in an idle connection state, and N being a natural number; and acquiring, in response to identifying a target connection stack corresponding to the target storage node primary key from the connection mapping table, target network connection information from N pieces of network connection information comprised in the target connection stack, establishing a target connection relationship with the target storage node based on the target network connection information, and acquiring, from the target storage node based on the target connection relationship, service data requested by the node access request.

17. The apparatus according to claim 16, wherein the acquiring a target storage node primary key of the target storage node comprises:

acquiring a target node name and a target node version number of the target storage node; and combining the target node name and the target node version number to generate the target storage node primary key of the target storage node.

18. The apparatus according to claim 16, wherein the acquiring, in response to identifying a target connection stack corresponding to the target storage node primary key from the connection mapping table, target network connection information from N pieces of network connection information comprised in the target connection stack comprises:

performing, when the target connection stack corresponding to the target storage node primary key is found from the connection mapping table, out-of-stack processing on network connection information located at a top of the stack from the N pieces of network connection information comprised in the target connection stack, and determining the out-of-stack network connection information as the target network connection information.

19. The apparatus according to claim 16, wherein the traversing a connection mapping table based on the target storage node primary key comprises:

adding a first read lock in a first read/write lock to a connection acquiring thread, and searching the connection mapping table for the target storage node primary key based on the first read lock; and the one or more processors are further configured to implement:

performing an unlock operation on the first read lock, and adding a blocking waiting thread to the connection acquiring thread when the target connection stack corresponding to the target storage node primary key is not found from the connection mapping table, the blocking waiting thread being in a blocking running state; and invoking the connection acquiring thread to traverse the connection mapping table again based on the target storage node primary key when the blocking waiting thread recovers from the blocking running state to a blocking release state.

20. One or more non-transitory computer readable storage media, storing computer readable instructions; and the computer readable instructions, when executed by one or more processors, implementing:

receiving a node access request for a target storage node, and acquiring a target storage node primary key of the target storage node;

traversing a connection mapping table based on the target storage node primary key, the connection mapping table comprising M storage node primary keys and connection stacks respectively corresponding to the M storage node primary keys, and M being a positive integer; one connection stack comprising N pieces of network connection information in an idle connection state, and N being a natural number; and acquiring, in response to identifying a target connection stack corresponding to the target storage node primary key from the connection mapping table, target network connection information from N pieces of network connection information comprised in the target connection stack, establishing a target connection relationship with the target storage node based on the target network connection information, and acquiring, from the target storage node based on the target connection relationship, service data requested by the node access request.

* * * * *